United States Patent [19]

Suzuki

[11] Patent Number: 5,751,485
[45] Date of Patent: May 12, 1998

[54] LENS CAPABLE OF SHORT DISTANCE PHOTOGRAPHING WITH VIBRATION REDUCTION FUNCTION

[75] Inventor: Kenzaburo Suzuki, Yokohama, Japan

[73] Assignee: Nikon Corporation, Tokyo, Japan

[21] Appl. No.: 510,267

[22] Filed: Aug. 2, 1995

Related U.S. Application Data

[63] Continuation-in-part of Ser. No. 348,841, Nov. 28, 1994, abandoned.

[30] Foreign Application Priority Data

| Nov. 29, 1993 | [JP] | Japan | 5-323282 |
| Mar. 18, 1994 | [JP] | Japan | 6-074439 |
| Mar. 18, 1994 | [JP] | Japan | 6-074440 |
| Jan. 27, 1995 | [JP] | Japan | 7-031544 |
| Jan. 27, 1995 | [JP] | Japan | 7-031545 |

[51] Int. Cl.$^6$ .......... G02B 27/64; G02B 15/14
[52] U.S. Cl. .......... 359/557; 359/554; 359/689
[58] Field of Search .......... 359/554–557, 359/676–677, 683–684, 689, 745, 748, 784, 791; 396/52–55; 348/208

[56] References Cited

U.S. PATENT DOCUMENTS

| 4,978,205 | 12/1990 | Sato | 359/557 |
| 4,986,643 | 1/1991 | Moriyama | 359/791 |
| 5,000,549 | 3/1991 | Yamazaki | 359/557 |
| 5,000,551 | 3/1991 | Shibayama | 359/708 |
| 5,007,720 | 4/1991 | Hamanishi | 359/693 |
| 5,039,211 | 8/1991 | Hariyama | 359/557 |
| 5,040,881 | 8/1991 | Tsuji | 359/557 |
| 5,249,079 | 9/1993 | Umeda | 359/557 |
| 5,442,486 | 8/1995 | Sato | 359/557 |

*Primary Examiner*—Thong Nguyen
*Attorney, Agent, or Firm*—Shapiro and Shapiro

[57] ABSTRACT

A lens capable of a short distance photographing satisfies |βM|>0.25 (βM is the photographing magnification at a shortest photographing distance). The lens includes a plurality of lens groups respectively having positive or negative refracting powers. An interval between two neighboring lens groups changes for focusing, and at least a partial lens group, located at an image side of a lens group which is movable for focusing, is a vibration reduction lens group which is movable in a direction substantially perpendicular to an optical axis.

7 Claims, 11 Drawing Sheets

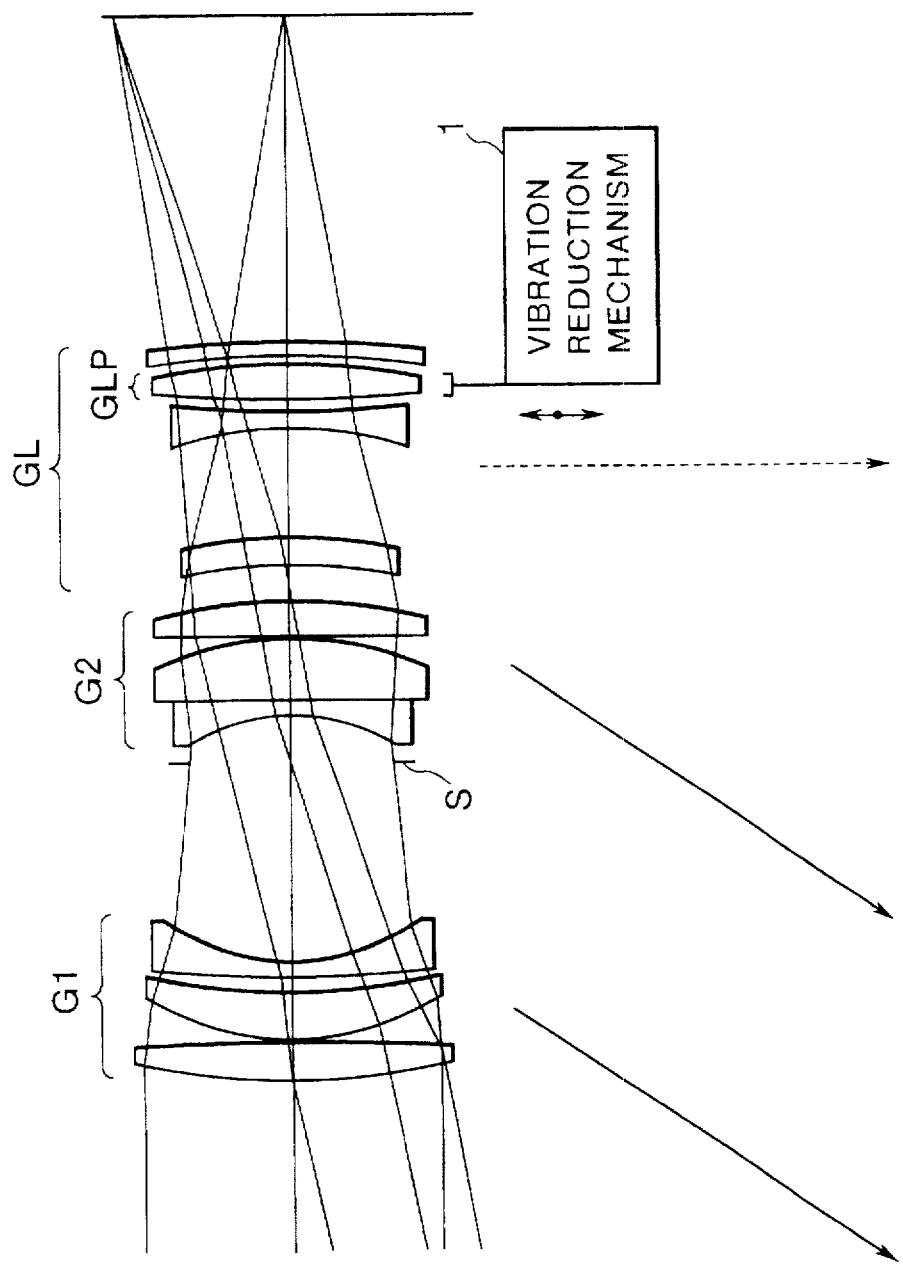

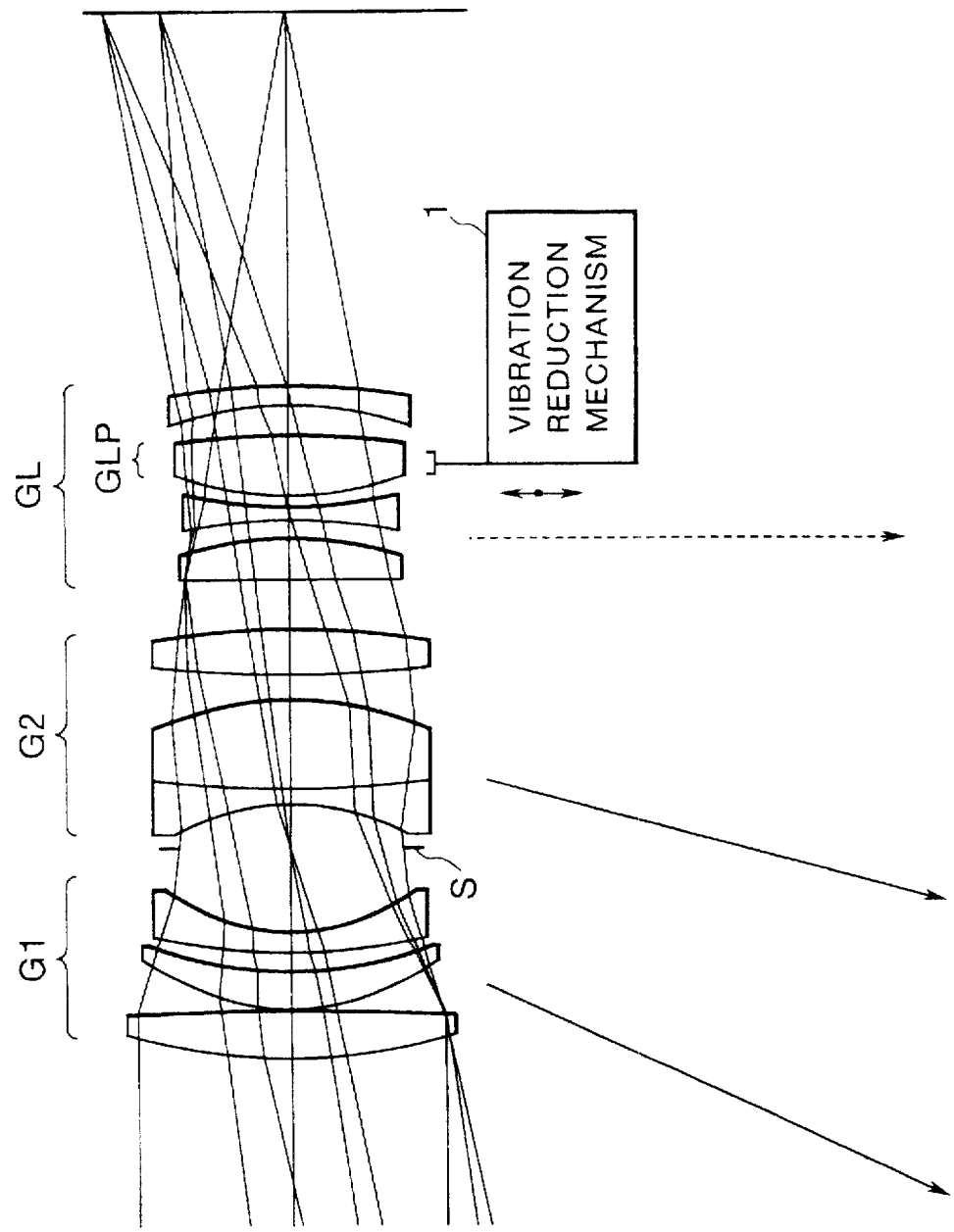

LENS CAPABLE OF SHORT DISTANCE PHOTOGRAPHING WITH VIBRATION REDUCTION FUNCTION

This application is a continuation-in-part of application Ser. No. 08/348,841 filed Nov. 28, 1994, now abandoned.

BACKGROUND OF THE INVENTION

1. Field of the Invention

The present invention relates to a lens capable of a short distance photographing (close-up) with a vibration reduction function, which is used in, e.g., a camera, a video camera, or the like and, more particularly, to a vibration reduction method for a lens capable of a short distance photographing or close-up (so-called a micro lens or macro lens).

2. Related Background Art

Conventionally, as disclosed in Japanese Laid-Open Patent Application Nos. 1-189621, 1-191112, and 1-191113, means for correcting a variation in image position caused by, e.g., a camera shake by moving all or some of the lenses in a lens group in a direction substantially perpendicular to the optical axis when the photographing distance is infinity or a distance close to infinity (in a state having a photographing magnification of almost 0) is known.

Note that correcting a variation in image position caused by, e.g., a camera shake by moving the lens group in a direction substantially perpendicular to the optical axis will be referred to as "vibration reduction" in this specification.

However, in the above-mentioned prior art, vibration reduction cannot be attained in a sufficiently large photographing magnification (e.g., x–½) state, and is impossible to attain when the photographing magnification is in an almost one to one magnification (x–1) state.

Note that no vibration reduction techniques having sufficient imaging performance for a lens capable of a short distance photographing (close-up) have been disclosed in known references (including patent publications).

SUMMARY OF THE INVENTION

The present invention has been made in consideration of the above situation, and has as its object to provide a lens capable of a short distance photographing (close-up), which has a vibration reduction function, has a compact structure and high performance, and is suitably used for a photograph, video image, and the like.

A lens capable of a short distance photographing (close-up) comprises a plurality of lens groups respectively having positive or negative refracting powers, at least one lens group interval changes for focusing, and the lens satisfies the following condition at a minimum photographing distance:

$$|\beta M|>0.25$$

($\beta M$ is the photographing magnification at a shortest photographing distance)

Of the plurality of lens groups, at least one lens group, which is located at the image side of a lens group movable for focusing, is moved in a direction substantially perpendicular to the optical axis, thereby attaining vibration reduction.

BRIEF DESCRIPTION OF THE DRAWINGS

FIG. 10 is a view showing the arrangement of a lens capable of a short distance photographing according to a 10th embodiment of the present invention; and FIG. 11 is a view showing the arrangement of a lens capable of a short distance photographing according to an 11th embodiment of the present invention.

DETAILED DESCRIPTION OF THE PREFERRED EMBODIMENTS

Figure 1:
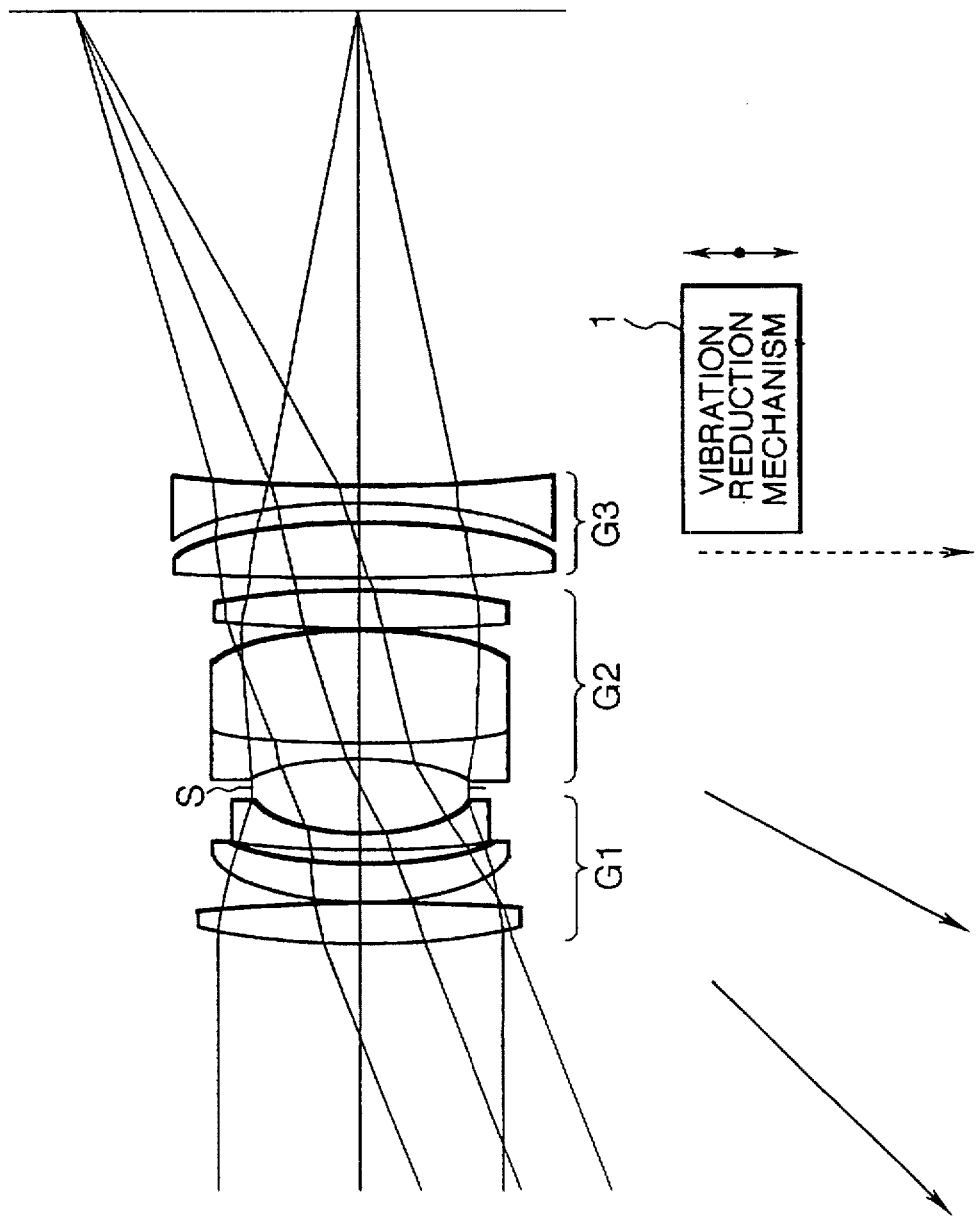
FIG. 1 is a view showing the arrangement of a lens capable of a short distance photographing (close-up) according to a first embodiment of the present invention.

According to the first mode of the present invention, a lens capable of a short distance photographing (close-up), which comprises, in turn from the object side, a first lens group G1 having a positive refracting power, a second lens group G2 having a positive refracting power, and a third lens group G3 arranged at the most image side and having a negative refracting power, and in which the first and second lens groups G1 and G2 move toward the object side when focusing is effected from infinity to a short distance, comprises: displacement means for attaining vibration reduction by moving the third lens group G3 in a direction substantially perpendicular to the optical axis, and satisfies the following condition:

$$|\beta M|>0.4$$

where $\beta M$ is the photographing magnification at a shortest photographing distance.

When the focal length of the third lens group G3 is represented by $fL$, the focal length of the lens as a whole at infinity is represented by $f$, and a maximum displacement amount of the third lens group G3 in the direction perpendicular to the optical axis upon vibration reduction is represented by $\Delta SL$, the lens capable of a short distance photographing (close-up) preferably satisfies the following conditions:

$$0.5<|fL|/f<5.0$$

$$\Delta SL/|fL|<0.1$$

Also, the lens capable of a short distance photographing (close-up) preferably comprises, on the optical axis, a stationary flare stop for shielding unnecessary rays upon movement of the third lens group in the direction substantially perpendicular to the optical axis for vibration reduction.

In the first mode, to be suitable for a lens capable of a short distance photographing (close-up) for a photograph, video image, or the like, the lens comprises, in turn from the object side, the first lens group G1 having the positive refracting power, the second lens group G2 having the positive refracting power, and the third lens group G3 arranged at the most image side and having the negative refracting power, and when focusing is effected from infinity to a short distance, the first and second lens groups G1 and G2 move toward the object side. To explain a reason why the present invention adopts this arrangement, the features and merits of a lens capable of a short distance photographing (close-up) of this type will be briefly described below.

First, the lens capable of a short distance photographing (close-up) with the above arrangement can obtain good imaging performance at photographing magnifications including $x-\frac{1}{2}$ and a one to one magnification ($x-1$).

Since the negative lens group (third lens group G3) is arranged at the image side to constitute a telephoto lens type as a whole, the total lens length can be shortened as compared to the focal length of the lens as a whole. For this reason, the lens can be advantageously made compact, and the moving amount of the first and second lens groups G1 and G2 when focusing is effected from infinity to a short distance can be set to be smaller than that of a conventional whole extension type, thus providing advantages in the arrangements of holding and driving mechanisms.

In addition, the Petzval sum of the lens as a whole can be well balanced by the effect of the third lens group G3 as a negative lens group, thus providing an advantage in aberration correction.

The present invention provides optimal conditions for vibration reduction for a lens capable of a short distance photographing (close-up) of a type suitable for a photograph, video image, or the like.

The conditions of the first mode of the present invention will be described in detail below.

First, in the present invention, when focusing is effected from infinity to a short distance, the first and second lens groups G1 and G2 largely move toward the object side. Therefore, if the first and second lens groups G1 and G2 are used as a vibration correction optical system which is displaced in the direction perpendicular to the optical axis, the holding and driving mechanisms are undesirably complicated and become bulky.

For this reason, in the first mode of the present invention, in order to simplify the mechanisms of the entire lens system and to attain good aberration characteristics upon vibration reduction, the displacement means is provided to a lens group at the most image side, i.e., the third lens group G3 to perform vibration reduction.

The lens capable of a short distance photographing (close-up) according to the first mode of the present invention satisfies the following conditional formula (1) in addition to the above-mentioned arrangement:

$$|\beta M|>0.4 \quad (1)$$

where $\beta M$: the photographing magnification at the shortest photographing distance Conditional formula (1) shows short distance focusing performance of an optical system according to the present invention as the lens capable of a short distance photographing (close-up), and at the same time, defines a range (lower limit value) of the photographing magnification at the practical shortest photographing distance.

In order to further improve imaging performance, the lens preferably satisfies the following conditional formulas (2) and (3):

$$0.5<|fL|/f<5.0 \quad (2)$$

$$\Delta SL/|fL|<0.1 \quad (3)$$

where fL: the focal length of the third lens group G3 f: the focal length of the entire lens at infinity $\Delta SL$: the maximum displacement amount, in the direction perpendicular to the optical axis, of the third lens group G3 upon vibration reduction Conditional formula (2) defines an appropriate range in association with the ratio between the focal length fL of the third lens group G3 and the focal length f of the entire lens upon infinity photographing. When the ratio exceeds the upper limit value of conditional formula (2), the focal length fL of the third lens group G3 becomes too large, and the total lens length becomes large, thus disturbing a compact structure as one of the objects of the present invention. Also, the curvature of field and the spherical aberration tend to become excessive in the negative direction. On the contrary, when the ratio is set to be smaller than the lower limit of conditional formula (2), the focal length fL of the third lens group G3 becomes too small, and the back focus becomes too short. Also, the curvature of field and the spherical aberration tend to become excessive in the positive direction. Furthermore, a large positive distortion tends to be generated.

When the upper limit value of conditional formula (2) is set to be 3 or less, and its lower limit value is set to be 1 or more, imaging performance can be further improved.

Conditional formula (3) defines an appropriate range of the maximum displacement amount of the third lens group G3 upon vibration reduction in association with the ratio to the focal length fL of the third lens group G3.

When the ratio exceeds the upper limit value of conditional formula (3), the maximum displacement amount of the third lens group G3 upon vibration reduction becomes too large, and as a result, the aberration variation amount upon vibration reduction becomes large. In particular, the difference, in the optical axis direction, between the best imaging plane in the meridional direction and the best imaging plane in the sagittal direction increases.

In order to further improve imaging performance, in addition to the above-mentioned conditions, the lens desirably satisfies the following conditional formulas (4) and (5):

$$1.05<\beta L<2 \quad (4)$$

$$L/f<0.5 \quad (5)$$

where $\beta L$: the imaging magnification of the third lens group G3

L: the on-axis thickness of the third lens group G3

Conditional formula (4) defines an appropriate range for the imaging magnification of the third lens group G3. When the imaging magnification is set to be smaller than the lower limit value of conditional formula (4), the imaging magnification of the third lens group G3 becomes too small. For this reason, the ratio of the moving amount of an image to the moving amount of the third lens group G3 as a vibration reduction lens group upon vibration reduction becomes too small. As a result, in order to reliably correct image movement caused by, e.g., a camera shake and to obtain sufficient vibration reduction performance, the moving amount of the third lens group G3 as a vibration reduction lens group must be set to be excessively large. On the contrary, when the imaging magnification exceeds the upper limit value of conditional formula (4), in both the infinity state and the short distance photographing state, the spherical aberration tends to be excessive, and the distortion becomes large in the positive direction. Note that when the upper limit value of conditional formula (4) is set to be 1.6 or less, and its lower limit value is set to be 1.15 or more, imaging performance can be further improved.

Conditional formula (5) defines an appropriate range of the ratio between the on-axis thickness of the third lens group G3 and the focal length of the entire lens system at infinity. When the ratio exceeds the upper limit value of conditional formula (5), the on-axis thickness of the third lens group G3 as a vibration reduction lens group becomes too large, and as a result, the mechanism for vibration reduction becomes bulky and is complicated.

Upon constitution of an actual third lens group G3, in addition to the above-mentioned conditions, it is desirable to satisfy the following conditions (6) and (7):

$$1.7 < N- \tag{6}$$

$$30 < v- \tag{7}$$

where

N−: the maximum one of refractive indices of negative lens components in the third lens group G3 v−: the minimum one of Abbe's numbers of the negative lens components in the third lens group G3

When the maximum refractive index is set to be smaller than the lower limit value of conditional formula (6), in both the infinity state and the short distance photographing state, the spherical aberration tends to become excessive in the positive direction, and the distortion tends to become large in the positive direction. Since the Petzval sum also tends to shift in the negative direction, the curvature of field tends to become large in the positive direction.

When the minimum Abbe's number exceeds the upper limit value of conditional formula (7), in both the infinity state and the short distance photographing state, the on-axis chromatic aberration at short wavelengths tends to become excessive in the positive direction.

In order to further improve imaging performance, in addition to the above-mentioned conditions, the lens preferably satisfies the following conditional formulas (8) and (9):

$$-3 < q- < 5 \tag{8}$$

$$-6 < q+ < 2 \tag{9}$$

where q+: the shape factor of a positive lens at the most object side in the third lens group q−: the shape factor of a negative lens at the most object side in the third lens group Note that the shape factor q is given by the following equation (a) when the radius of curvature of the surface, at the object side, of a lens is represented by $r_a$, and the radius of curvature of the surface, at the image side, of the lens is represented by $r_b$:

$$q=(r_b+r_a)/(r_b-r_a) \tag{a}$$

When the shape factor is set to be lower than the lower limit value of conditional formula (8), in both the infinity state and the short distance photographing state, the spherical aberration tends to become excessive in the positive direction, and the distortion tends to become large in the positive direction. On the contrary, when the shape factor exceeds the upper limit value of conditional formula (8), in both the infinity state and the short distance photographing state, an outward coma tends to be generated in rays above a principal ray.

When the shape factor is set to be lower than the lower limit value of conditional formula (9), in both the infinity state and the short distance photographing state, the spherical aberration tends to become excessive in the negative direction, and the distortion tends to become large in the negative direction. On the contrary, when the shape factor exceeds the upper limit value of conditional formula (9), in both the infinity state and the short distance photographing state, the spherical aberration tends to become excessive in the negative direction, and an inward coma tends to be generated in rays above a principal ray.

When a stationary flare stop is arranged on the optical axis in addition to an aperture stop, unnecessary rays can be shielded when the lens group is displaced across the optical axis for vibration reduction, and generation of a ghost and unnecessary exposure can be avoided.

The third lens group G3 is preferably fixed along the optical axis in a short distance focusing state so as to simplify the holding and driving mechanisms.

In order to obtain good imaging performance by performing sufficient aberration correction in the short distance focusing state, the first and second lens groups G1 and G2 are desirably almost symmetrically arranged to sandwich the aperture stop therebetween. More specifically, the surface, at the most image side, of the first lens group G1 is preferably a diverging surface which is convex at the object side and diverges rays, and the surface, at the most image side, of the second lens group G2 is preferably a diverging surface which is convex at the object side.

Furthermore, a lens, at the most object side, of the first lens group G1 is preferably a positive meniscus lens having a convex surface facing the object side.

When the third lens group G3 is constituted by two lenses, the third lens group G3 is preferably constituted by negative and positive lenses. More specifically, the third lens group G3 is preferably constituted by a negative lens having a strong concave surface facing the object side, and a biconvex lens.

When the third lens group G3 is constituted by three lenses, the third lens group G3 is preferably constituted by a negative lens and two positive lenses. More specifically, the third lens group G3 is preferably constituted by a positive lens having a strong convex surface facing the image side, a biconcave lens, and a positive lens having a strong convex surface facing the object side.

In order to achieve satisfactory chromatic aberration correction in the short distance focusing state, each of the first and second lens groups G1 and G2 which move in the short distance focusing state and have a positive refracting power must include an achromatic lens. Therefore, each lens group must have at least one lens component having a negative refracting power.

At this time, in each of the first and second lens groups G1 and G2, a minimum Abbe's number vm of the Abbe's numbers of negative lens components preferably satisfies the following conditional formula (10):

$$vm<37 \tag{10}$$

In order to further improve imaging performance, the refracting power distribution of the first and second lens groups G1 and G2 is important, and if the focal lengths of the first and second lens groups G1 and G2 are respectively represented by f1 and f2, the lens preferably satisfies the following conditional formula (11):

$$1.5 < f1/f2 < 2.5 \quad (11)$$

Also, some lenses in the third lens group G3 or a given lens group may be designed to be a vibration correction group.

Furthermore, since the depth at the object field side becomes smaller as the photographing magnification increases, an out-of-focus state tends to occur. In this case, an auto-focus system and a lens capable of a short distance photographing (close-up) of the present invention can be combined to avoid the above-mentioned out-of-focus state.

In the second mode of the present invention, a lens capable of a short distance photographing (close-up) which comprises, in turn from the object side, a first lens group G1 having a positive refracting power and a second lens group G2 having a positive refracting power at the object side, and comprises a last lens group GL having a negative refracting power at the most image side, and in which the first and second lens groups move toward the object side when focusing is effected from infinity to a short distance object, comprises displacement means for achieving vibration reduction by moving a partial lens group GLP having a negative refracting power in the last lens group GL in a direction substantially perpendicular to the optical axis, and satisfies the following condition:

$$0.25 < |\beta M|$$

where $\beta M$ is the photographing magnification at the shortest photographing distance.

When the focal length of the last lens group GL is represented by fL, the focal length of the partial lens group GLP in the last lens group GL is represented by fLP, and the maximum displacement amount, in the direction perpendicular to the optical axis, of the partial lens group upon vibration reduction is represented by $\Delta$SLP, the lens capable of a short distance photographing (close-up) preferably satisfies the following conditions:

$$\Delta SLP/|fLP| < 0.1$$

$$0.1 < fLP/fL < 2$$

Also, the lens capable of a short distance photographing (close-up) preferably comprises, on the optical axis, a stationary flare stop for shielding unnecessary rays when the partial lens group GLP in the last lens group GL moves in the direction substantially perpendicular to the optical axis for vibration reduction.

In the second mode of the present invention, to be suitable for a lens capable of a short distance photographing (close-up) for a photograph, video image, or the like, the lens comprises, in turn from the object side, the first lens group G1 having the positive refracting power and the second lens group G2 having the positive refracting power at the object side, and comprises the last lens group GL having the negative refracting power at the most image side, and when focusing is effected from infinity to a short distance object, the first and second lens groups G1 and G2 move toward the object side. To explain a reason why the present invention adopts this arrangement, the features and merits of a lens capable of a short distance photographing (close-up) of this type will be briefly described below.

First, the lens capable of a short distance photographing (close-up) with the above arrangement can obtain good imaging performance at photographing magnifications including x-½ and an equal magnification (x-1).

Since the negative lens group (last lens group GL) is arranged at the image side to constitute a telephoto lens type as a whole, the total lens length can be shortened as compared to the focal length of the lens as a whole. For this reason, the lens can be advantageously made compact, and the moving amount of the first and second lens groups G1 and G2 when focusing is effected from infinity to a short distance can be set to be smaller than that of a conventional whole extension type, thus providing advantages in the arrangements of holding and driving mechanisms.

In addition, the Petzval sum of the lens as a whole can be well balanced by the effect of the last lens group GL as a negative lens group, thus providing an advantage in aberration correction.

The present invention provides optimal conditions for vibration reduction for a lens capable of a short distance photographing (close-up) of a type suitable for a photograph, video image, or the like.

The conditions of the second mode of the present invention will be described in detail below.

First, in the present invention, when focusing is effected from infinity to a short distance object, the first and second lens groups G1 and G2 largely move toward the object side. Therefore, if the first and second lens groups G1 and G2 are used as a vibration correction optical system which is displaced in the direction perpendicular to the optical axis, the holding and driving mechanisms are undesirably complicated and become bulky.

For this reason, in the second mode of the present invention, in order to simplify the mechanisms of the entire lens system and to attain good aberration characteristics upon vibration reduction, the displacement means is provided to a lens group at the most image side, i.e., the partial lens group GLP having the negative refracting power in the last lens group GL to perform vibration reduction. The partial lens group GLP will be referred to as a "vibration reduction lens group" hereinafter.

The lens capable of a short distance photographing (close-up) according to the second mode of the present invention satisfies the following conditional formula (12) in addition to the above-mentioned arrangement:

$$0.25 < |\beta M| \quad (12)$$

where $\beta M$: the photographing magnification at the shortest photographing distance Conditional formula (12) shows short distance focusing performance of an optical system according to the present invention as the lens capable of a short distance photographing (close-up), and at the same time, defines a range (lower limit value) of the photographing magnification at the practical shortest photographing distance.

When the photographing magnification is set to be lower than the lower limit value of conditional formula (12), the photographing magnification at the shortest photographing distance becomes too small to obtain sufficient short distance focusing performance, and is not suitable for a practical use.

When the lower limit value of conditional formula (12) is set to be 0.45, more sufficient short distance focusing performance can be assured.

In order to further improve imaging performance, the lens preferably satisfies the following conditional formulas (13) and (14):

$$\Delta SLP/|fLP| < 0.1 \quad (13)$$

$$0.1 < fLP/fL < 2 \quad (14)$$

where fL: the focal length of the last lens group GL fLP: the focal length of the vibration reduction lens group GLP in the last lens group GL $\Delta$SLP: the maximum displacement amount, in the direction perpendicular to the optical axis, of the vibration reduction lens group GLP in the last lens group GL upon vibration reduction Conditional formula (13) defines an appropriate range of the maximum displacement amount of the vibration reduction lens group GLP upon vibration reduction in association with the ratio to the focal length fLP of the vibration reduction lens group GLP. When the ratio exceeds the upper limit value of conditional formula (13), the maximum displacement amount of the vibration reduction lens group GLP in the last lens group GL upon vibration reduction becomes too large, and as a result, the aberration variation amount upon vibration reduction becomes large. In particular, at a peripheral position on the image plane, the difference, in the optical axis direction, between the best imaging plane in the meridional direction and the best imaging plane in the sagittal direction increases.

When the upper limit value of conditional formula (13) is set to be 0.03, imaging performance can be further improved.

Conditional formula (14) defines an appropriate range in association with the ratio between the focal length fLP of the vibration reduction lens group GLP and the focal length fL of the last lens group GL. When the ratio exceeds the upper limit value of conditional formula (14), the refracting power of the vibration reduction lens group GLP becomes too small. As a result, not only the spherical aberration tends to become excessive in the negative direction, but also a negative curvature of field tends to be generated. On the contrary, when the ratio is set to be lower than the lower limit value of conditional formula (14), the refracting power of the vibration reduction lens group GLP becomes too large. As a result, not only the spherical aberration tends to become excessive in the positive direction, but a positive curvature of field tends to be generated. Also, the variations in various aberrations upon vibration reduction tend to become excessive.

When the upper limit value of conditional formula (14) is set to be 0.4, and its lower limit value is set to be 0.15, imaging performance can be further improved.

In order to further improve imaging performance, the lens desirably satisfies the following conditional formula (15):

$$0.5 < |fL|/f < 4 \quad (15)$$

where f: the focal length of the entire lens system in the infinity photographing state Conditional formula (15) defines an appropriate range in association with the ratio between the focal length fL of the last lens group GL and the focal length f of the entire lens system in the infinity photographing state. When the ratio exceeds the upper limit value of conditional formula (15), the focal length fL of the last lens group GL having the negative refracting power at the most image side becomes too large, and as a result, the lens length becomes large, thus disturbing a compact structure as one of the objects of the present invention. Also, the curvature of field and the spherical aberration tend to become excessive in the negative direction. On the contrary, when the ratio is set to be lower than the lower limit value of conditional formula (15), the focal length fL of the last lens group GL having the negative refracting power at the most image side becomes too small, and a result, the back focus is shortened. Also, the curvature of field and the spherical aberration tend to become excessive in the positive direction. Furthermore, a large positive distortion tends to be generated.

In order to further improve imaging performance and vibration reduction performance, in addition to the above-mentioned conditions, the lens desirably satisfies the following conditional formulas (16) and (17):

$$\Delta SLP/D < 0.2 \quad (16)$$

$$L/f < 0.5 \quad (17)$$

where

D: the effective diameter of the surface, at the most object side, of the vibration reduction lens group GLP L: the on-axis thickness of the vibration reduction lens group GLP Conditional formula (16) defines an appropriate range of the maximum displacement amount $\Delta$SLP of the vibration reduction lens group GLP upon vibration reduction in association with the ratio to the effective diameter D of the surface, at the most object side, of the vibration reduction lens group GLP. When the ratio exceeds the upper limit value of conditional formula (16), in both the infinity photographing state and the short distance photographing state, stray light tends to be mixed within the effective diameter of the vibration reduction lens group GLP. When a stationary flare stop is arranged on the optical axis, the mixing of stray light can be eliminated. When the ratio exceeds the upper limit value of conditional formula (16), a mechanism for vibration reduction becomes bulky and complicated.

When the upper limit value of conditional formula (16) is set to be 0.08, imaging performance and vibration reduction performance can be further improved.

Conditional formula (17) defines an appropriate range of the ratio between the on-axis thickness of the vibration reduction lens group GLP and the focal length of the entire lens system in the infinity photographing state. When the ratio exceeds the upper limit value of conditional formula (17), the on-axis thickness of the vibration reduction lens group GLP becomes too large, resulting in a bulky and complicated mechanism for vibration reduction.

Upon construction of an actual vibration reduction lens group GLP, in addition to the above-mentioned conditions, the lens desirably satisfies the following formulas (18) and (19):

$$1.5 < N- \quad (18)$$

$$30 < \nu- \quad (19)$$

where

N–: the maximum one of refractive indices of negative lens components in the vibration reduction lens group GLP $\nu$–: the minimum one of Abbe's numbers of the negative lens components in the vibration reduction lens group GLP Note that N– and $\nu$– respectively represent the refractive index and Abbe's number for the d-line ($\lambda$=587.6 nm).

When the refractive index is set to be lower than the lower limit value of conditional formula (18), in both the infinity photographing state and the short distance photographing state, the spherical aberration tends to become excessive in the positive direction, and the distortion tends to become large in the positive direction. Since the Petzval sum tends to shift in the negative direction, a large positive curvature of field tends to be generated.

When the Abbe's number is set to be lower than the lower limit value of conditional formula (19), in both the infinity photographing state and the short distance photographing state, the on-axis chromatic aberration at short wavelengths tends to become excessive in the positive direction.

In addition to the above-mentioned conditions, upon construction of an actual optical system of the second mode, the lens desirably satisfies the following conditions.

When a stationary flare stop is arranged on the optical axis in addition to an aperture stop, unnecessary rays can be shielded when the lens group is displaced across the optical axis for vibration reduction, and generation of a ghost and unnecessary exposure can be avoided.

The vibration reduction lens group GLP is preferably fixed along the optical axis in a short distance focusing state so as to simplify the holding and driving mechanisms.

In order to obtain good imaging performance by performing sufficient aberration correction in the short distance focusing state, the first and second lens groups G1 and G2 are preferably almost symmetrically arranged to sandwich the aperture stop therebetween. More specifically, the surface, at the most image side, of the first lens group G1 is preferably a diverging surface which is convex at the object side, and the surface, at the most image side, of the second lens group G2 is preferably a diverging surface which is convex at the object side.

In order to achieve satisfactory chromatic aberration correction in the short distance focusing state, each of the first and second lens groups G1 and G2 which move in the short distance focusing state and have a positive refracting power must include an achromatic lens. Therefore, each lens group must have at least one lens component having a negative refracting power.

At this time, among both of the first and second lens groups G1 and G2, a minimum Abbe's number νm of the Abbe's numbers of negative lens components preferably satisfies the following conditional formula (20):

$$\nu m < 38 \quad (20)$$

In order to further improve imaging performance, the refracting power distribution of the first and second lens groups G1 and G2 is important, and if the focal lengths of the first and second lens groups G1 and G2 are respectively represented by f1 and f2, the lens preferably satisfies the following conditional formula (21):

$$1.5 < f1/f2 < 3.0 \quad (21)$$

Furthermore, since the depth at the object field side becomes smaller as the photographing magnification increases, an out-of-focus state tends to occur. In this case, an auto-focus system and a lens capable of a short distance photographing (close-up) of the present invention can be combined to avoid the above-mentioned out-of-focus state.

In the third mode of the present invention, a lens capable of a short distance photographing (close-up) which comprises, in turn from the object side, a first lens group G1 having a positive refracting power and a second lens group G2 having a negative refracting power at the object side, and comprises a last lens group GL having a positive refracting power at the most image side, and in which the interval between the first and second lens groups increases when focusing is effected from infinity to a short distance object, comprises displacement means for achieving vibration reduction by moving a partial lens group GLP having a positive refracting power in the last lens group GL in a direction substantially perpendicular to the optical axis, and satisfies the following condition:

$$0.25 < |\beta M|$$

where βM is the photographing magnification at the shortest photographing distance.

When the focal length of the last lens group GL is represented by fL, the focal length of the entire lens system in the infinity photographing state is represented by f, the focal length of the partial lens group GLP in the last lens group GL is represented by fLP, and the maximum displacement amount, in the direction perpendicular to the optical axis, of the partial lens group upon vibration reduction is represented by ΔSLP, the lens capable of a short distance photographing (close-up) preferably satisfies the following conditions:

$$0.3 < fL/f < 1.5$$

$$\Delta SLP/fLP < 0.1$$

Also, the lens capable of a short distance photographing (close-up) preferably comprises, on the optical axis, a stationary flare stop for shielding unnecessary rays when the partial lens group GLP in the last lens group GL moves in the direction substantially perpendicular to the optical axis for vibration reduction.

In the third mode of the present invention, to be suitable for a lens capable of a short distance photographing (close-up) for a photograph, video image, or the like, the lens comprises, in turn from the object side, the first lens group G1 having the positive refracting power and the second lens group G2 having the negative refracting power at the object side, and comprises the last lens group GL having the positive refracting power at the most image side, and when focusing is effected from infinity to a short distance object, the interval between the first and second lens groups G1 and G2 increases. To explain a reason why the present invention adopts this arrangement, the features and merits of a lens capable of a short distance photographing (close-up) of this type will be briefly described below.

First, the lens capable of a short distance photographing (close-up) with the above arrangement can obtain good imaging performance at photographing magnifications including x–½ and an equal magnification (x–1).

Since the second lens group G2 has a negative refracting power, a composite principal point of the first and second lens groups G1 and G2 can be located at the object side of the second lens group G2. For this reason, a compact structure can be advantageously achieved. Furthermore, since the moving amount of the second lens group G2 when focusing is effected from infinity to a short distance object can be set to be smaller than that of a conventional front-element extension type, the lens of the third mode is advantageous in arrangements of holding and driving mechanisms.

In addition, the Petzval sum of the lens as a whole can be well balanced by the effect of the negative refracting power of the second lens group G2, thus providing an advantage in aberration correction.

The present invention provides optimal conditions for vibration reduction for a lens capable of a short distance photographing (close-up) of a type suitable for a photograph, video image, or the like.

The conditions of the third mode of the present invention will be described in detail below.

First, in the lens capable of a short distance photographing (close-up) of the above-mentioned type, the first lens group G1 is the largest in size. For this reason, if the first lens group G1 is used as a vibration correction optical system which is displaced in the direction perpendicular to the optical axis, the holding and driving mechanisms are undesirably complicated and become bulky.

It is not preferable, either, if the second lens group G2 which moves along the optical axis upon focusing is used as a vibration correction optical system since the holding and driving mechanisms are undesirably complicated and become bulky.

For these reasons, according to the present invention, in order to simplify the mechanisms of the entire lens system and to attain good aberration characteristics upon vibration reduction, the displacement means is provided to a lens group at the most image side, i.e., the partial lens group GLP having the positive refracting power in the last lens group GL to perform vibration reduction. The partial lens group GLP will be referred to as a "vibration reduction lens group" hereinafter.

The lens capable of a short distance photographing (close-up) according to the third mode of the present invention satisfies the following conditional formula (22) in addition to the above-mentioned arrangement:

$$0.25 < |\beta M| \tag{22}$$

where $\beta M$: the photographing magnification at the shortest photographing distance Conditional formula (22) shows short distance focusing performance of an optical system according to the present invention as the lens capable of a short distance photographing (close-up), and at the same time, defines a range (lower limit value) of the photographing magnification at the practical shortest photographing distance.

When the photographing magnification is set to be lower than the lower limit value of conditional formula (22), the photographing magnification at the shortest photographing distance becomes too small to obtain sufficient short distance focusing performance, and is not suitable for a practical use.

When the lower limit value of conditional formula (22) is set to be 0.45, more sufficient short distance focusing performance can be assured.

In order to further improve imaging performance, the lens preferably satisfies the following conditional formulas (23) and (24):

$$0.3 < fL/f < 1.5 \tag{23}$$

$$\Delta SLP/fLP < 0.1 \tag{24}$$

where fL: the focal length of the last lens group GL f: the focal length of the entire lens system in the infinity photographing state fLP: the focal length of the vibration reduction lens group GLP in the last lens group GL $\Delta SLP$: the maximum displacement amount, in the direction perpendicular to the optical axis, of the vibration reduction lens group GLP in the last lens group GL upon vibration reduction Conditional formula (23) defines an appropriate range in association with the ratio between the focal length fL of the last lens group GL and the focal length f of the entire lens system in the infinity photographing state. When the ratio exceeds the upper limit value of conditional formula (23), the focal length fL of the last lens group GL becomes too large, and the total lens length is prolonged, thus disturbing a compact structure. In addition, the spherical aberration tends to become excessive in the negative direction. On the contrary, when the ratio is set to be lower than the lower limit value of conditional formula (23), the focal length fL of the last lens group GL becomes too small, the spherical aberration in the infinity photographing state tends to become excessive in the positive direction, and the variation in curvature of field in a short distance focusing state becomes large. In addition, the Petzval sum tends to largely shift in the positive direction, and as a result, a negative curvature of field tends to be generated.

When the upper limit value of conditional formula (23) is set to be 0.8, and its lower limit value is set to be 0.45, imaging performance can be further improved.

Conditional formula (24) defines an appropriate range of the maximum displacement amount $\Delta SLP$ of the vibration reduction lens group GLP upon vibration reduction in association with the ratio to the focal length fLP of the vibration reduction lens group GLP. When the ratio exceeds the upper limit value of conditional formula (24), the maximum displacement amount of the vibration reduction lens group GLP in the last lens group GL upon vibration reduction becomes too large, and as a result, the aberration variation amount upon vibration reduction becomes large. In particular, at a peripheral position on the image plane, the difference, in the optical axis direction, between the best imaging plane in the meridional direction and the best imaging plane in the sagittal direction increases. When the upper limit value of conditional formula (24) is set to be 0.03, imaging performance can be further improved.

In order to further improve imaging performance, the lens capable of a short distance photographing (close-up) desirably satisfies the following conditional formulas (25) and (26):

$$WD/f < 5.0 \tag{25}$$

$$|\Delta|/f < 0.5 \tag{26}$$

where

WD: the distance from an object to a lens surface of a lens element that is closest to the object side, when the lens capable of a short distance photographing (close-up) is in the shortest distance photographing state $\Delta$: the change amount of the on-axis air gap between the first and second lens groups G1 and G2 in the infinity photographing state and the shortest distance photographing state Note that the sign of the change amount $\Delta$ is positive when the on-axis air gap increases, and is negative when it decreases.

Conditional formula (25) shows short distance focusing performance as a lens capable of a short distance photographing (close-up), and defines a practical range in association with the distance WD from an object to a lens surface, at the most object side, of the lens capable of a short distance photographing (close-up) in the shortest distance photographing state.

When the distance exceeds the upper limit of conditional formula (25), the distance WD to the object in the shortest distance photographing state becomes too large, and short distance focusing performance tends to become short.

When the upper limit value of conditional formula (25) is set to be 3.0, more sufficient short distance focusing performance can be assured.

When the change amount exceeds the upper limit of conditional formula (26), the moving amount of the second lens group G2 in a focusing operation becomes too large, and the aberration variation amount in a short distance focusing state tends to become large. In particular, the spherical aberration, the curvature of field at the peripheral position on the image plane, and the astigmatism become undesirably large. In addition, the mechanical arrangement tends to be complicated.

In order to further improve imaging performance and vibration reduction performance, in addition to the above-mentioned conditions, the lens desirably satisfies the following conditional formulas (27) and (28):

$$0.5 < fLP/fL < 2.5 \tag{27}$$

$$L/f < 0.25 \tag{28}$$

where

L: the on-axis thickness of the vibration reduction lens group GLP

Conditional formula (27) defines an appropriate range in association with the ratio between the focal length fLP of the vibration reduction lens group GLP and the focal length fL of the last lens group GL. When the ratio exceeds the upper limit value of conditional formula (27), in both the infinity photographing state and the short distance photographing state, not only the spherical aberration tends to become excessive in the positive direction, but also the distortion becomes large in the positive direction. On the contrary, when the ratio is set to be lower than the lower limit value of conditional formula (27), the focal length fLP of the vibration reduction lens group GLP becomes too small. As a result, not only the spherical aberration becomes excessive in the negative direction, but also a negative curvature of field tends to be generated.

Also, variations in various aberrations upon vibration reduction tend to become excessive.

When the upper limit value of conditional formula (27) is set to be 1.8, and its lower limit value is set to be 1.0, imaging performance and vibration reduction performance can be further improved.

Conditional formula (28) defines an appropriate range in association with the ratio between the on-axis thickness of the vibration reduction lens group GLP and the focal length of the entire lens system in the infinity photographing state. When the ratio exceeds the upper limit value of conditional formula (28), the on-axis thickness of the vibration reduction lens group GLP becomes too large, and as a result, the mechanism for vibration reduction tends to be bulky and complicated.

Upon construction of an actual vibration reduction lens group GLP, in addition to the above-mentioned conditions, the lens desirably satisfies the following formulas (29) and (30):

$$1.5 < N+ \tag{29}$$

$$40 < v+ \tag{30}$$

where

N+: the maximum one of refractive indices of positive lens components in the vibration reduction lens group GLP v+: the minimum one of Abbe's numbers of the positive lens components in the vibration reduction lens group GLP Note that N+ and v+ respectively represent the refractive index and Abbe's number for the d-line ($\lambda=587.6$ nm).

When the refractive index is set to be lower than the lower limit value of conditional formula (29), in both the infinity photographing state and the short distance photographing state, the spherical aberration tends to become excessive in the negative direction, and the distortion tends to become large in the negative direction. Since the Petzval sum tends to shift in the positive direction, a large negative curvature of field tends to be generated.

When the Abbe's number is set to be lower than the lower limit value of conditional formula (30), in both the infinity photographing state and the short distance photographing state, the on-axis chromatic aberration at short wavelengths tends to become excessive in the negative direction.

In addition to the above-mentioned conditions, upon construction of an actual optical system of the second mode, the lens desirably satisfies the following conditions.

When a stationary flare stop is arranged on the optical axis in addition to an aperture stop, unnecessary rays can be shielded when the lens group is displaced across the optical axis for vibration reduction, and generation of a ghost and unnecessary exposure can be avoided.

The vibration reduction lens group GLP is preferably fixed along the optical axis in a short distance focusing state so as to simplify the holding and driving mechanisms.

When the vibration reduction lens group GLP is constituted by a single lens, it is preferably constituted by a biconvex lens or a meniscus lens which has a surface having a strong radius of curvature facing the object side.

In order to obtain good imaging performance upon construction of the entire lens system capable of a short distance photographing (close-up), the refracting power distribution of the first and second lens groups G1 and G2 is important, and if the focal lengths of the first and second lens groups G1 and G2 are respectively represented by f1 and f2, the lens preferably satisfies the following conditional formula (31):

$$1.2 < f1/|f2| < 2.0 \tag{31}$$

In order to further improve imaging performance, an aperture stop S is preferably arranged near the second lens group G2 or the last lens group GL. In addition, the vibration reduction lens group GLP is preferably arranged at the image side of the aperture stop S.

When the lens capable of a short distance photographing (close-up) of the present invention is constituted by the first lens group G1 having a positive refracting power, the second lens group G2 having a negative refracting power, and the last lens group GL having a positive refracting power, it is desirable to set rays between the second lens group G2 and the last lens group GL to be a substantially parallel system.

When the first lens group G1 is divided into a plurality of lens groups, and the air gap between two adjacent lens groups is to be changed in a short distance focusing state, imaging performance can be further improved (see the seventh embodiment).

Furthermore, the second lens group G2 is preferably constituted to include at least two lens groups having a negative refracting power.

When the vibration reduction lens group GLP is aligned at the image side of the central position in the last lens group GL, a variation in spherical aberration upon vibration reduction can be reduced.

When the last lens group GL having a positive refracting power at the most image side is arranged, a cemented lens of negative and positive lenses is preferably arranged at the most object side.

Furthermore, since the depth at the object field side becomes smaller as the photographing magnification increases, an out-of-focus state tends to occur. In this case, an auto-focus system and a lens capable of a short distance photographing (close-up) of the present invention can be combined to avoid the above-mentioned out-of-focus state.

In the fourth mode of the present invention, a lens capable of a short distance photographing, which comprises a first lens group G1 having a positive refracting power at the most object side, a second lens group G2 arranged at the image side of the first lens group G1 and having a negative refracting power, and a last lens group GL having a positive refracting power at the image side, and in which the interval between the first and second lens groups G1 and G2 increases when focusing is effected from infinity to a short distance object, and a photographing magnification βM at a shortest photographing distance satisfies the following condition:

$$0.25 < |\beta M|$$

comprises:

displacement means for attaining vibration reduction by moving a partial lens group GLP, having a negative refracting power, as part of the last lens group GL in a direction substantially perpendicular to the optical axis.

According to a preferred embodiment of the present invention, when the focal length of the last lens group GL is represented by fL, the focal length of the partial lens group GLP in the last lens group GL is represented by fLP, the focal length of the entire lens system in an infinity photographing state is represented by f, and the maximum displacement amount of the partial lens group GLP in the direction perpendicular to the optical axis upon vibration reduction is represented by ΔSLP, the lens capable of a short distance photographing satisfies the following conditions:

$$0.2 < fL/f < 5.0$$

$$\Delta SLP/|fLP| < 0.1$$

In the fourth mode of the present invention, to be suitable for a lens capable of a short distance photographing for a photograph, video image, or the like which has a relatively long focal length, the lens comprises the first lens group G1 having the positive refracting power, the second lens group G2 arranged at the image side of the first lens group G1 and having the negative refracting power, and the last lens group GL arranged closest to the image side and having the positive refracting power, and when focusing is effected from infinity to a short distance object, the interval between the first and second lens groups G1 and G2 increases. To explain a reason why the present invention adopts this arrangement, the features and merits of a lens capable of a short distance photographing of this type will be briefly described below.

First, the lens capable of a short distance photographing with the above arrangement can obtain good imaging performance at photographing magnifications including x−½ and an equal magnification (x−1), in addition to the infinity photographing state.

The second lens group G2 has the negative refracting power, and a composite principal point of the first and second lens groups G1 and G2 can be located at the object side of the first lens group G1. For this reason, the lens can be advantageously made compact.

Furthermore, since the moving amount of the second lens group G2 when focusing is effected from infinity to a short distance object can be set to be lower than that of a conventional front lens group extension type (i.e., a lens system in which a front side lens group is moved for focusing), the lens of the fourth mode is advantageous in arrangements of holding and driving mechanisms.

In addition, the Petzval sum of the lens as a whole can be well balanced by the effect of the negative refracting power of the second lens group G2, thus providing an advantage in aberration correction.

The present invention provides optimal conditions for vibration reduction for a lens capable of a short distance photograph of a type suitable for a photograph, video image, or the like.

The conditions of the fourth mode of the present invention will be described in detail below.

In the lens capable of a short distance photographing of the above-described type, the first lens group G1 is the largest one. Therefore, if the first lens group G1 is used as a vibration correction optical system which is displaced in the direction perpendicular to the optical axis for vibration reduction, the holding and driving mechanisms are undesirably complicated and become bulky.

In addition, when focusing is to be effected from infinity to a short distance object, the second lens group G2 moves along the optical axis. Therefore, if the second lens group G2 is used as a vibration correction optical system which is displaced in the direction perpendicular to the optical axis, the holding and driving mechanisms are undesirably complicated and become bulky.

For this reason, in the present invention, in order to simplify the mechanisms of the entire lens system and to attain good aberration characteristics upon vibration reduction, the displacement means is provided to a lens group at the most image side, i.e., the partial lens group GLP having the negative refracting power as part of the last lens group GL to perform vibration reduction. The partial lens group GLP is referred to as "a vibration reduction lens group" hereinafter.

When a stationary flare stop is arranged on the optical axis in addition to an aperture stop, unnecessary rays can be shielded when the vibration reduction lens group GLP is displaced across the optical axis for vibration reduction, and generation of a ghost and unnecessary exposure can be avoided.

The lens capable of a short distance photographing according to the fourth mode of the present invention satisfies the following conditional formula (32) in addition to the above-mentioned arrangement:

$$0.25 < |\beta M| \qquad (32)$$

where

βM: the photographing magnification at the shortest photographing distance

Conditional formula (32) shows an ability of short distance photographing of an optical system according to the present invention as the lens capable of a short distance photographing, and at the same time, defines an appropriate range (lower limit value) of the photographing magnification at the practical shortest photographing distance.

When the photographing magnification is set to be lower than the lower limit value of conditional formula (32), the photographing magnification at the shortest photographing distance becomes too small to obtain a sufficient ability of short distance photographing, and is not suitable for a practical use.

In order to further improve imaging performance, the lens preferably satisfies the following conditional formulas (33) and (34):

$$0.2 < fL/f < 5.0 \qquad (33)$$

$$\Delta SLP/|fLP| < 0.1 \qquad (34)$$

where fL: the focal length of the last lens group GL f: the focal length of the entire lens system in the infinity photographing state fLP: the focal length of the vibration reduction lens group GLP in the last lens group GL ΔSLP: the maximum displacement amount, in the direction perpendicular to the optical axis, of the vibration reduction lens group GLP upon vibration reduction Conditional formula (33) defines an appropriate range in association with the ratio between the focal length of the last lens group GL and the focal length of the entire lens system capable of a short distance photographing in the infinity photographing state.

When the ratio exceeds the upper limit value of conditional formula (33), the total lens length is prolonged, thus disturbing a compact structure. In addition, the spherical aberration tends to become excessive in the negative direction.

On the contrary, when the ratio is set to be lower than the lower limit value of conditional formula (33), the focal length of the last lens group GL becomes too small, the spherical aberration in the infinity photographing state tends to become excessive in the positive direction, and the variation in curvature of field in a short distance focusing state becomes large. In addition, the Petzval sum tends to change greatly in the positive direction, and as a result, a negative curvature of field tends to be generated.

When the lower limit value of conditional formula (33) is set to be 0.4, and its upper limit value is set to be 3.0, imaging performance can be further improved.

Conditional formula (34) defines an appropriate range of the maximum displacement amount ΔSLP of the vibration reduction lens group GLP upon vibration reduction in association with the ratio to the focal length fLP of the vibration reduction lens group GLP.

When the ratio exceeds the upper limit value of conditional formula (34), the maximum displacement amount of the vibration reduction lens group GLP in the last lens group GL upon vibration reduction becomes too large, and as a result, the aberration variation amount upon vibration reduction becomes large. In particular, at a peripheral position on the image plane, the difference, in the optical axis direction, between the best imaging plane in the meridional direction and the best imaging plane in the sagittal direction increases.

When the upper limit value of conditional formula (34) is set to be 0.03, imaging performance can be further improved.

In the present invention, the lens desirably satisfies the following conditional formulas (35) and (36):

$$WD/f<5.0 \quad (35)$$

$$0<\Delta/f<0.5 \quad (36)$$

where

WD: the distance from an object to a lens surface of a lens element that is closest to the object side when the lens is in the shortest distance photographing state Δ: the change amount (a positive sign indicates an increase) of the on-axis air gap between the first and second lens groups G1 and G2 in focusing from the infinity photographing state to the shortest photographing distance Conditional formula (35) shows an ability of short distance photographing as a lens capable of a short distance photographing, and defines a practical range in association with the on-axis distance (WD) from an object to a lens surface at the most object side at the shortest photographing distance.

When the distance exceeds the upper limit value of conditional formula (35), the distance WD to the object in the shortest distance photographing state becomes too large, an ability of short distance photographing tends to become short, and the lens capable of a short distance photographing is not suitable for a practical use.

Conditional formula (36) defines an appropriate range of the change amount of the on-axis air gap between the first and second lens groups G1 and G2 generated in focusing from the infinity photographing state to the shortest photographing distance.

When the change amount exceeds the upper limit value of conditional formula (36), the moving amount of the second lens group G2 becomes too large, and the aberration variation amount in a short distance focusing state tends to become large. In particular, the spherical aberration, the curvature of field at the peripheral position on the image plane, and the astigmatism become undesirably large. In addition, the mechanical arrangement tends to be complicated.

In the present invention, the lens desirably satisfies the following conditional formulas (37) and (38):

$$0.2<\text{fLP/fL}<10.0 \quad (37)$$

$$L/f<0.25 \quad (38)$$

where

L: the on-axis thickness of the vibration reduction lens group GLP

When the ratio is set to be lower than the lower limit value of conditional formula (37), the focal length of the vibration reduction lens group GLP is too small, and not only the spherical aberration tends to become excessive in the negative direction, but also the curvature of field tends to generate in the negative direction.

In addition, a variation in aberrations upon vibration reduction becomes excessive so as not to obtain good imaging performance.

On the contrary, when the ratio exceeds the upper limit value of conditional formula (37), in both the infinity photographing state and the short distance photographing state, the spherical aberration tends to become excessive in the positive direction, and the distortion becomes large in the positive direction.

When the upper limit value of conditional formula (37) is set to be 5.0, and its lower limit value is set to be 0.6, imaging performance can be further improved.

When the ratio exceeds the upper limit value of conditional formula (38), the on-axis thickness of the vibration reduction lens group GLP (i.e., a distance, along the optical axis, from the surface, at the most object side, of the vibration reduction lens group GLP to its surface at the most image side) becomes too large, and as a result, the mechanism for vibration reduction tends to be bulky and complicated.

In actual construction of the last lens group GLP, the lens desirably satisfies the following formulas (39) and (40):

$$1.5<N- \quad (39)$$

$$35<v- \quad (40)$$

where

N-: the maximum one of refractive indices of negative lens components in the vibration reduction lens group GLP ν−: the maximum one of Abbe's numbers of the negative lens components in the vibration reduction lens group GLP Note that N− and ν− respectively represent the refractive index and Abbe's number for the d-line (λ=587.6 nm).

When the refractive index is set to be lower than the lower limit value of conditional formula (39), in both the infinity photographing state and the short distance photographing state, the spherical aberration tends to become excessive in the positive direction, and the distortion tends to become large in the positive direction.

Since the Petzval sum tends to shift in the negative direction, the curvature of field tends to become large in the positive direction.

When the refractive index is set to be lower than the lower limit value of conditional formula (40), in both the infinity photographing state and the short distance photographing state, the on-axis chromatic aberration at short wavelengths tends to become excessive in the positive direction so as not to obtain good imaging performance.

The lens desirably satisfies the following conditions so as to obtain good imaging performance and good vibration reduction performance.

The vibration reduction lens group GLP is preferably fixed in a direction along the optical axis in a short distance focusing state so as to simplify the holding and driving mechanisms.

When the vibration reduction lens group GLP is constituted by a single lens, it is preferable to arrange the vibration reduction lens group GLP at the image side of an aperture stop.

To construct the entire lens system capable of a short distance photographing, the refracting power distribution of the first and second lens groups G1 and G2 is important, and the lens preferably satisfies the following conditional formula (41):

$$1.2 < f1/|f2| < 2.0 \quad (41)$$

where f1: the focal length of the first lens group G1 in the infinity photographing state f2: the focal length of the second lens group G2 in the infinity photographing state In order to further improve imaging performance, an aperture stop is preferably arranged near the second lens group G2 or a third lens group G3. In addition, the vibration reduction lens group GLP is preferably arranged at the image side of the aperture stop.

When an optical system of the present invention is constituted by the first lens group G1 having a positive refracting power, the second lens group G2 having a negative refracting power, and the last lens group GL having a positive refracting power, it is desirable to have a substantially parallel system between the second lens group G2 and the last lens group GL.

When the first lens group G1 is divided into a plurality of partial lens groups, and the air gaps between the respective partial lens groups are to be changed to effect short distance focusing, imaging performance can be further improved (see the ninth embodiment).

In actual construction of the second lens group G2, the second lens group G2 is preferably constituted to include at least two lens components having a negative refracting power.

When the vibration reduction lens group GLP is aligned at the image side of the central position in the last lens group GL on the optical axis, a variation in spherical aberration upon vibration reduction can be reduced.

In actual construction of the last lens group GL, a cemented lens of negative and positive lenses is preferably arranged closest to the object side.

Furthermore, since the depth of the object field becomes smaller as the focal length and the photographing magnification increase, an out-of-focus state tends to occur. In this case, an auto-focus system and a lens capable of a short distance photographing of the present invention can be combined to avoid the above-mentioned out-of-focus state.

In the fifth mode of the present invention, a lens capable of a short distance photographing which comprises, in turn from the object side, a first lens group G1 having a positive refracting power, a second lens group G2 having a positive refracting power, and a last lens group GL having a negative refracting power at the most image side, and in which the first and second lens groups G1 and G2 move toward the object side when focusing is effected from infinity to a short distance object, and a photographing magnification βM at a shortest photographing distance satisfies:

$$0.25 < |\beta M|,$$

comprises:

displacement means for attaining vibration reduction by moving a partial lens group GLP, having a positive refracting power, as part of the last lens group GL in a direction substantially perpendicular to the optical axis.

According to a preferred embodiment of the present invention, when the focal length of the last lens group GL is represented by fL, the focal length of the partial lens group GLP in the last lens group GL is represented by fLP, and the maximum displacement amount of the partial lens group GLP in the direction perpendicular to the optical axis upon vibration reduction is represented by ΔSLP, a lens capable of a short distance photographing satisfies the following conditions:

$$\Delta SLP/fLP < 0.1$$

$$0.1 < |fLP/fL| < 2$$

In the fifth mode of the present invention, to be suitable for a lens capable of a short distance photographing for a photograph, video image, or the like, the lens comprises, in turn from the object side, the first lens group G1 having the positive refracting power, the second lens group G2 having the positive refracting power, and the last lens group GL having the negative refracting power at the most image side, and when focusing is effected from infinity to a short distance object, the first and second lens groups G1 and G2 move toward the object side. To explain a reason why the present invention adopts this arrangement, the features and merits of a lens capable of a short distance photographing of this type will be briefly described below.

First, the lens capable of a short distance photographing with the above arrangement can obtain good imaging performance at photographing magnifications including x−½ and an equal magnification (x−1).

Since the negative lens group (last lens group GL) is arranged at the image side to constitute a telephoto lens type as a whole, the total lens length can be shortened as compared to the focal length of the entire lens system. For this reason, the lens can be advantageously made compact, and the moving amount of the first and second lens groups G1 and G2 when focusing is effected from infinity to a short distance object can be set to be smaller than that of a conventional whole extension type, thus providing advantages in the arrangements of holding and driving mechanisms.

In addition, the Petzval sum of the lens as a whole can be well balanced by the effect of the negative refracting power of the last lens group GL, thus providing an advantage in aberration correction.

The present invention provides optimal conditions for vibration reduction for a lens capable of a short distance photographing of a type suitable for a photograph, video image, or the like.

The conditions of the fifth mode of the present invention will be described in detail below.

First, in the present invention, when short distance correction is to be performed, i.e., focusing is effected from infinity to a short distance object, the first and second lens groups G1 and G2 largely move toward the object side. Therefore, if the first and second lens groups G1 and G2 are used as a vibration correction optical system which is displaced in the direction perpendicular to the optical axis, the holding and driving mechanisms are undesirably complicated and become bulky.

For this reason, in the present invention, in order to simplify the mechanisms of the entire lens system and to attain good aberration characteristics upon vibration reduction, the displacement means is provided to a lens group at the most image side, i.e., the partial lens group GLP having the positive refracting power as part of the last lens group GL to perform vibration reduction. The partial lens group GLP is referred to as "a vibration reduction lens group" hereinafter.

The lens capable of a short distance photographing according to the present invention satisfies the following conditional formula (42) in addition to the above-mentioned arrangement:

$$0.25<|\beta M| \tag{42}$$

where $\beta M$: the photographing magnification at the shortest photographing distance Conditional formula (42) shows an ability of short distance photographing of an optical system according to the present invention as the lens capable of a short distance photographing, and at the same time, defines a range (lower limit value) of the photographing magnification at the practical shortest photographing distance.

When the photographing magnification is set to be lower than the lower limit value of conditional formula (42), the photographing magnification at the shortest photographing distance becomes too small to obtain a sufficient ability of short distance photographing, and is not suitable for a practical use.

In order to further improve imaging performance, the lens preferably satisfies the following conditional formulas (43) and (44):

$$\Delta SLP/fLP<0.1 \tag{43}$$

$$0.1<fLP/|fL|<2 \tag{44}$$

where fL: the focal length of the last lens group GL fLP: the focal length of the vibration reduction lens group GLP in the last lens group GL $\Delta SLP$: the maximum displacement amount, in the direction perpendicular to the optical axis, of the vibration reduction lens group GLP upon vibration reduction Conditional formula (43) defines an appropriate range in association with the ratio between the maximum displacement amount $\Delta SLP$ of the vibration reduction lens group GLP and the focal length fLP of the vibration reduction lens group GLP upon vibration reduction.

When the ratio exceeds the upper limit value of conditional formula (43), the maximum displacement amount of the vibration reduction lens group GLP in the last lens group GL upon vibration reduction becomes too large, and as a result, the aberration variation amount upon vibration reduction becomes large.

In particular, at a peripheral position on the image plane, the difference, in the optical axis direction, between the best imaging plane in the meridional direction and the best imaging plane in the sagittal direction increases.

When the upper limit value of conditional formula (43) is set to be 0.05, imaging performance can be further improved.

Conditional formula (44) defines an appropriate range in association with the ratio between the focal length fLP of the vibration reduction lens group GLP and the focal length fL of the last lens group GL.

When the ratio exceeds the upper limit value of conditional formula (44), the refracting power of the vibration reduction lens group GLP becomes too small, and the spherical aberration tends to become excessive in the negative direction. In addition, the curvature of field tends to occur in the negative direction.

On the contrary, when the ratio is set to be lower than the lower limit value of conditional formula (44), the refracting power of the vibration reduction lens group GLP becomes too large, and the spherical aberration tends to become excessive in the positive direction. In addition, the curvature of field tends to occur in the positive direction.

A variation in aberrations becomes excessive upon vibration reduction not to obtain good imaging performance.

When the upper limit value of conditional formula (44) is set to be 1.0, and its lower limit value is set to be 0.2, imaging performance can be further improved.

In order to further improve imaging performance, the lens preferably satisfies the following conditional formula (45):

$$0.5<|fL|/f<4 \tag{45}$$

where f: the focal length of the entire lens system in the infinity photographing state Conditional formula (45) defines an appropriate range in association with the ratio between the focal length fL of the last lens group GL and the focal length f of the entire lens system in the infinity photographing state.

When the ratio exceeds the upper limit value of conditional formula (45), the focal length fL of the last lens group GL having the negative refracting power at the most image side becomes too large to prolong the total lens length, thus disturbing a compact structure as one of the objects of the present invention. In addition, the curvature of field and the spherical aberration tend to become excessive in the negative direction.

On the contrary, when the ratio is set to be lower than the lower limit value of conditional formula (45), the focal length fL of the last lens group GL having the negative refracting power at the most image side becomes too small, and the back focus becomes too short. In addition, the curvature of field and the spherical aberration tend to become excessive in the positive direction. Furthermore, a large positive distortion is generated.

In order to further improve imaging performance and vibration reduction performance, the lens desirably satisfies the following conditional formulas (46) and (47):

$$\Delta SLP/D<0.2 \tag{46}$$

$$L/f < 0.5 \quad (47)$$

where

D: the effective diameter of the surface, at the most object side, of the vibration reduction lens group GLP L: the on-axis thickness of the vibration reduction lens group GLP Conditional formula (46) defines an appropriate range of the maximum displacement amount ΔSLP of the vibration reduction lens group GLP upon vibration reduction in association with the ratio to the effective diameter (diameter) D of the surface, at the most object side, of the vibration reduction lens group GLP.

When the ratio exceeds the upper limit value of conditional formula (46), in both the infinity photographing state and the short distance photographing state, stray light tends to be mixed within the effective diameter (diameter) of the vibration reduction lens group GLP. When a stationary flare stop is arranged on the optical axis, the mixing of stray light can be reduced. Further, a mechanism for vibration reduction undesirably becomes bulky and complicated.

Conditional formula (47) defines an appropriate range of the ratio between the on-axis thickness of the vibration reduction lens group GLP and the focal length of the entire lens system in the infinity photographing state.

When the ratio exceeds the upper limit value of conditional formula (47), the on-axis thickness of the vibration reduction lens group GLP becomes too large, resulting in a bulky and complicated mechanism for vibration reduction.

In actual construction of the vibration reduction lens group GLP, the lens desirably satisfies the following formulas (48) and (49):

$$N+ < 1.8 \quad (48)$$

$$\nu+ < 70 \quad (49)$$

where

N+: the minimum one of refractive indices of positive lens components in the vibration reduction lens group GLP ν+: the maximum one of Abbe's numbers of the positive lens components in the vibration reduction lens group GLP Note that N+ and ν+ respectively represent the refractive index and Abbe's number for the d-line (λ=587.6 nm).

When the refractive index exceeds the upper limit value of conditional formula (48), in both the infinity photographing state and the short distance photographing state, the spherical aberration tends to become excessive in the positive direction.

Since the Petzval sum tends to shift in the negative direction, a large positive curvature of field tends to be generated.

When the Abbe's number exceeds the upper limit value of conditional formula (49), in both the infinity state and the short distance photographing state, the on-axis chromatic aberration at short wavelengths tends to become excessive in the positive direction, and good imaging performance is difficult to obtain.

Note that, in actual construction of an optical system, the lens desirably satisfies the following conditions.

When a stationary flare stop is arranged on the optical axis in addition to an aperture stop, unnecessary rays can be shielded when the lens group is displaced across the optical axis for vibration reduction, and generation of a ghost and unnecessary exposure can be avoided in advance.

The vibration reduction lens group GLP is preferably fixed along the optical axis in a short distance focusing state so as to simplify the holding and driving mechanisms.

In order to obtain good imaging performance by performing sufficient aberration correction in the short distance focusing state, the first and second lens groups G1 and G2 are preferably almost symmetrically arranged to sandwich the aperture stop therebetween. More specifically, the surface, at the most image side, of the first lens group G1 is preferably a diverging surface which is convex at the object side, and the surface, at the most object side, of the second lens group G2 is preferably a diverging surface which is convex at the image side.

In order to achieve satisfactory chromatic aberration correction in the short distance focusing state, each of the first and second lens groups G1 and G2 which move in the short distance focusing state and have a positive refracting power must include an achromatic lens. Therefore, each lens group must have at least one lens component having a negative refracting power.

At this time, in each of the first and second lens groups G1 and G2, a minimum Abbe's number νm of the Abbe's numbers of negative lens components preferably satisfies the following conditional formula (50):

$$\nu m < 38 \quad (50)$$

In order to further improve imaging performance, the refracting power distribution of the first and second lens groups G1 and G2 is important, and if the focal lengths of the first and second lens groups G1 and G2 are respectively represented by f1 and f2, the lens preferably satisfies the following conditional formula (51):

$$1.5 < f1/f2 < 2.5 \quad (51)$$

Furthermore, since the depth at the object field side becomes smaller as the photographing magnification increases, an out-of-focus state tends to occur. In this case, an auto-focus system and a lens capable of a short distance photographing of the present invention can be combined to avoid the above-mentioned out-of-focus state.

The first to third embodiments as the embodiments according to the first mode of the present invention will be described below. In each of these embodiments, a lens capable of a short distance photographing (close-up) with a vibration reduction function according to the first mode of the present invention, which comprises, in turn from the object side, a first lens group G1 having a positive refracting power, a second lens group G2 having a positive refracting power, and a third lens group G3 which is arranged at the most image side and has a negative refracting power, and in which the first and second lens groups G1 and G2 move toward the object side when focusing is effected from infinity to a short distance, comprises a displacement means 1 for achieving vibration reduction by moving the third lens group G3 in a direction substantially perpendicular to the optical axis.

[First Embodiment]

FIG. 1 is a view showing the arrangement of a lens capable of a short distance photographing (close-up) according to the first embodiment of the present invention. The lens capable of a short distance photographing (close-up) shown in FIG. 1 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a biconcave lens and a biconvex lens, and a biconvex lens, and a third lens group G3 which comprises a biconvex lens and a biconcave lens.

Note that an aperture stop S is arranged between the first and second lens groups G1 and G2, as shown in FIG. 1.

FIG. 1 shows the positional relationship among the lens groups in an infinity state, and when focusing is effected to a short distance, the lens groups move on the optical axis along paths indicated by arrows in FIG. 1. Note that the third lens group G3 is fixed in position in the optical axis direction, and is appropriately moved in a direction substantially perpendicular to the optical axis by a vibration reduction mechanism 1 as the displacement means, thereby correcting a blur of an image caused by, e.g., a camera shake.

In the first embodiment, the present invention is applied to a photograph lens having a relatively short focal length.

Table 1 below summarizes data values of the first embodiment of the present invention. In Table 1, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, and n and ν are respectively the refractive index and Abbe's number for the d-line (λ=587.6 nm).

TABLE 1 f = 59.9998
$F_{NO}$ = 2.82
2ω = 39.4°

| | r | d | ν | n |
|---|---|---|---|---|
| 1 | 70.8774 | 2.8000 | 46.79 | 1.76684 |
| 2 | −205.2345 | 0.1000 | | |
| 3 | 17.8517 | 3.5000 | 48.06 | 1.71700 |
| 4 | 35.8010 | 1.0000 | | |
| 5 | 93.5847 | 1.2000 | 35.70 | 1.62588 |
| 6 | 15.5020 | (d6 = variable) | | |
| 7 | −23.4716 | 1.2000 | 30.05 | 1.69895 |
| 8 | 120.0280 | 9.0000 | 53.89 | 1.71300 |
| 9 | −28.6509 | 0.2000 | | |
| 10 | 312.7704 | 2.8000 | 46.79 | 1.76684 |
| 11 | −60.9477 | (d11 = variable) | | |
| 12 | 280.3072 | 4.2000 | 33.75 | 1.64831 |
| 13 | −38.6396 | 1.5000 | | |
| 14 | −36.7728 | 1.5000 | 40.90 | 1.79631 |
| 15 | 192.9172 | (Bf) | | |

(Variable Interval Upon Short Distance Focusing)

| f, β | 59.99980 | −0.50000 | −1.00000 |
|---|---|---|---|
| d6 | 6.04963 | 10.97933 | 15.91790 |
| d11 | 1.23344 | 21.77380 | 44.13920 |
| Bf | 39.38439 | 39.38439 | 39.38439 |

(Vibration Reduction Data)

| | Infinity | Photographing Magnification (−1) | Photographing Magnification (−½) |
|---|---|---|---|
| Moving Amount of Vibration Reduction Lens Group in Direction Perpendicular to Optical Axis (mm) | 1.00 | 1.00 | 1.00 |
| Moving Amount of Image (mm) | −0.20 | −0.20 | −0.20 |

(The negative sign of the moving amount of an image indicates a direction opposite to the moving direction.)

TABLE 1-continued (Condition Corresponding Values)

(1) |βM| = 1.000
(2) |fL|/f = 2.820
(3) ΔSL/|fL| = 0.0059
(4) βL = 1.20
(5) L/f = 0.12
(6) N− = 1.79631
(7) ν− = 40.90
(8) q− = 0.680
(9) q+ = −0.758
(10) νm = 35.70 (G1), 30.05 (G2)
(11) f1/f2 = 1.803

[Second Embodiment]

Figure 2:
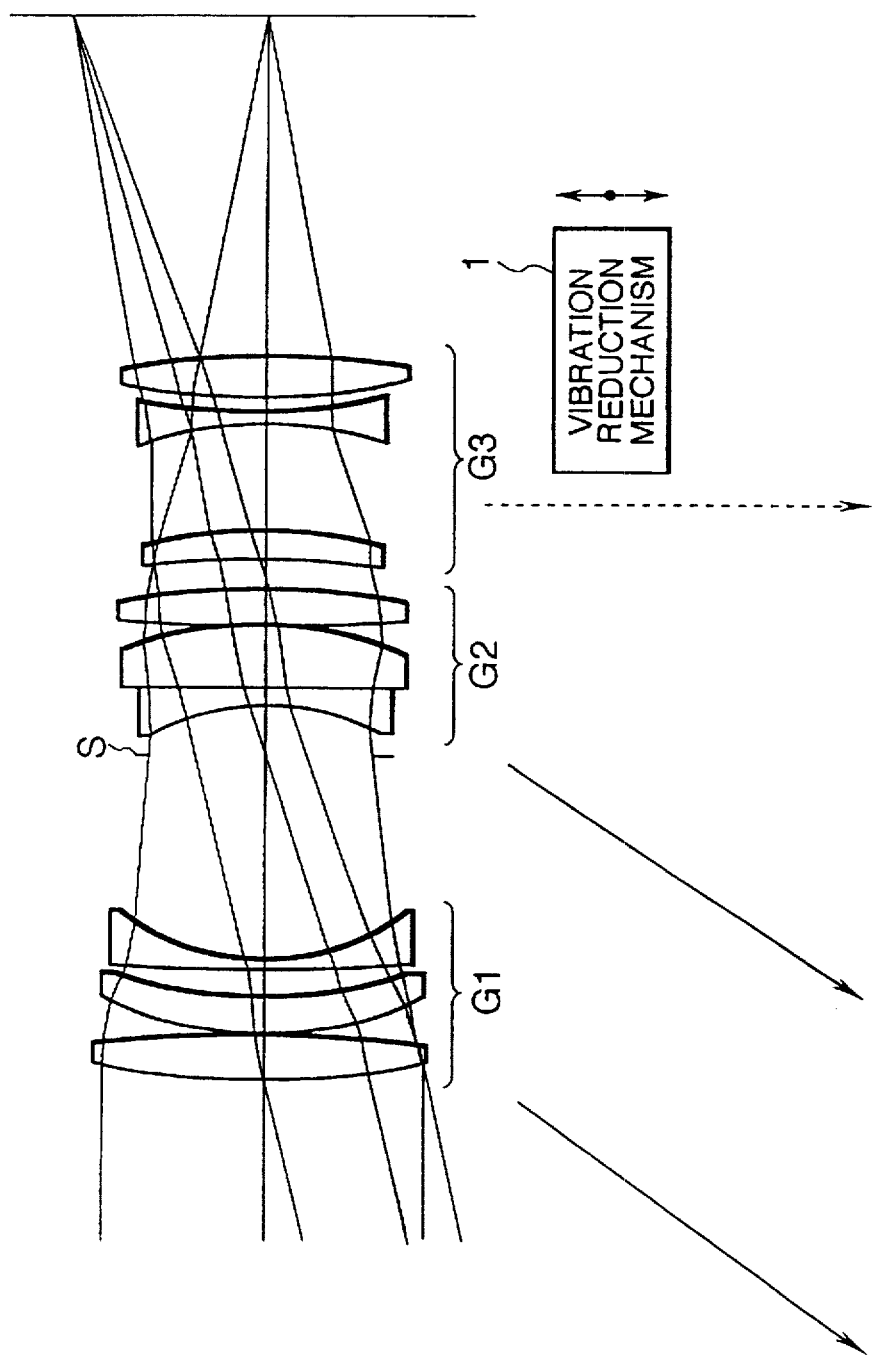
FIG. 2 is a view showing the arrangement of a lens capable of a short distance photographing (close-up) according to a second embodiment of the present invention.

FIG. 2 is a view showing the arrangement of a lens capable of a short distance photographing (close-up) according to the second embodiment of the present invention. The lens capable of a short distance photographing (close-up) shown in FIG. 2 is constituted by, in turn from the object side, a first lens group G1 which comprises a biconvex lens, a positive meniscus lens having a convex surface facing the object side, and a negative Meniscus lens having a convex surface facing the object side, a second lens group G2 which comprises a cemented lens of a negative meniscus lens having a concave surface facing the object side and a positive meniscus lens having a concave surface facing the object side, and a biconvex lens, and a third lens group G3 which comprises a biconcave lens and a biconvex lens.

Note that an aperture stop S is arranged between the first and second lens groups G1 and G2, as shown in FIG. 2.

FIG. 2 shows the positional relationship among the lens groups in an infinity state, and when focusing is effected to a short distance, the lens groups move on the optical axis along paths indicated by arrows in FIG. 1. Note that the third lens group G3 is fixed in position in the optical axis direction, and is appropriately moved in a direction substantially perpendicular to the optical axis by a vibration reduction mechanism 1 as the displacement means, thereby correcting a blur of an image caused by, e.g., a camera shake.

In the second embodiment, the present invention is applied to a photograph lens having a focal length larger than that of the first embodiment, and the second embodiment has substantially the same basic arrangement as that of the lens capable of a short distance photographing (close-up) of the first embodiment described above, except for the refracting powers and shapes of the lens groups, and the like.

Table 2 below summarizes data values of the second embodiment of the present invention. In Table 2, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, and n and ν are respectively the refractive index and Abbe's number for the d-line (λ=587.6 nm).

TABLE 2 f = 105
$F_{NO}$ = 2.86
2ω = 23.06°

| | r | d | ν | n |
|---|---|---|---|---|
| 1 | 89.1351 | 4.3000 | 55.60 | 1.69680 |
| 2 | −825.4576 | 0.2000 | | |

TABLE 2-continued

| | | | | |
|---|---|---|---|---|
| 3 | 34.3250 | 6.0000 | 55.60 | 1.69680 |
| 4 | 84.7777 | 2.0000 | | |
| 5 | 177.7491 | 2.0000 | 35.70 | 1.62588 |
| 6 | 26.8115 | (d6 = variable) | | |
| 7 | -30.2229 | 2.0000 | 33.75 | 1.64831 |
| 8 | -2217.9336 | 7.5000 | 53.75 | 1.69350 |
| 9 | -38.6200 | 0.2000 | | |
| 10 | 637.4222 | 4.3000 | 50.19 | 1.72000 |
| 11 | -68.9166 | (d11 = variable) | | |
| 12 | -91.5340 | 3.5000 | 25.50 | 1.80458 |
| 13 | -57.7982 | 13.0298 | | |
| 14 | -43.9910 | 2.000 | 40.90 | 1.79631 |
| 15 | 79.4290 | 1.5000 | | |
| 16 | 80.0850 | 4.5000 | 49.52 | 1.74429 |
| 17 | -111.5109 | (Bf) | | |

(Variable Interval Upon Short Distance Focusing)

| f, β | 105.00000 | -0.50000 | -1.00000 |
|---|---|---|---|
| d6 | 29.60250 | 27.91740 | 26.26180 |
| d11 | 3.33120 | 37.03340 | 70.14590 |
| Bf | 42.15420 | 42.15420 | 42.15420 |

(Vibration Reduction Data)

| | Infinity | Photo-graphing Magnification (-1) | Photo-graphing Magnification (-½) |
|---|---|---|---|
| Moving Amount of Vibration Reduction Lens Group in Direction Perpendicular to Optical Axis (mm) | 1.00 | 1.00 | 1.00 |
| Moving Amount of Image (mm) | -0.249 | -0.249 | -0.249 |

(The negative sign of the moving amount of an image indicates a direction opposite to the moving direction.)

(Condition Corresponding Values)

(1) |βM| = 1.000
(2) |fL|/f = 1.782
(3) ΔSL/|fL| = 0.0053
(4) βL = 1.249
(5) L/f = 0.234
(6) N- = 1.79631
(7) v- = 40.90
(8) q- = 0.287
(9) q+ = -4.427
(10) vm = 35.70 (G1), 33.75 (G2)
(11) f1/f2 = 2.142

[Third Embodiment]

Figure 3:
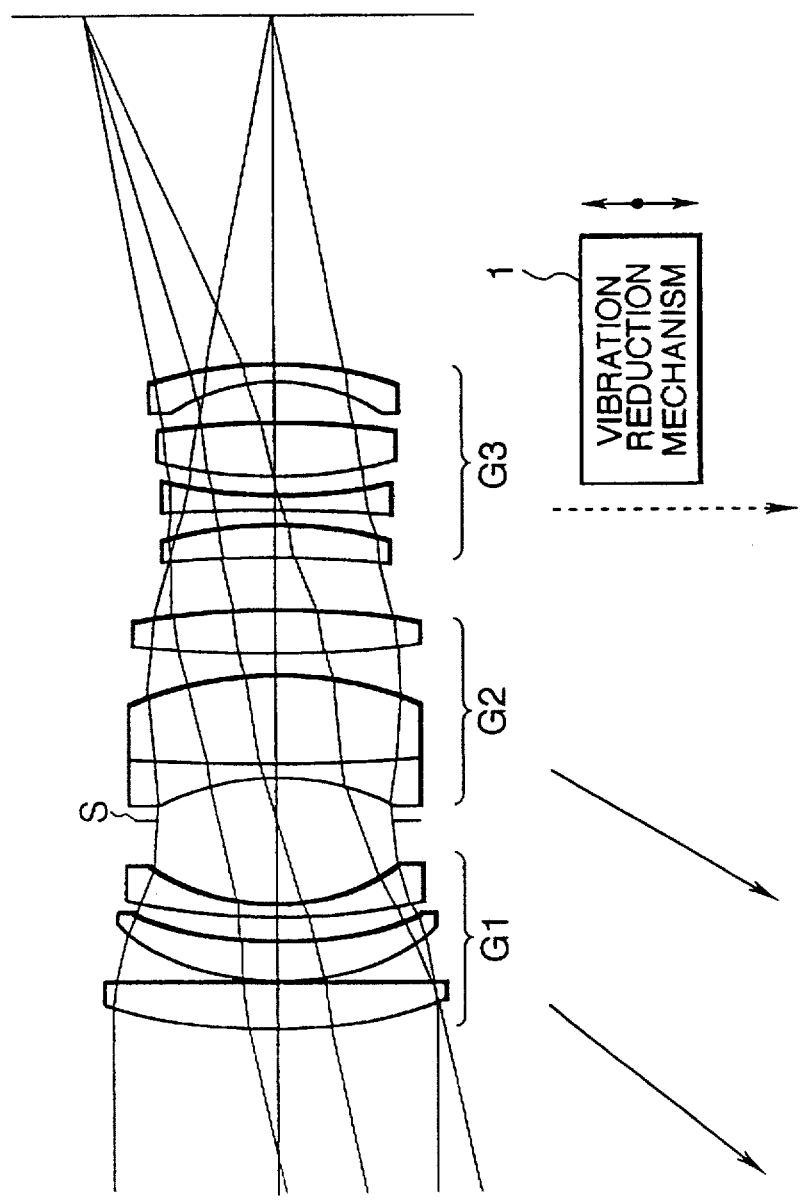
FIG. 3 is a view showing the arrangement of a lens capable of a short distance photographing (close-up) according to a third embodiment of the present invention.

FIG. 3 is a view showing the arrangement of a lens capable of a short distance photographing (close-up) according to the third embodiment of the present invention. The lens capable of a short distance photographing (close-up) shown in FIG. 3 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a biconcave lens and a biconvex lens, and a biconvex lens, and a third lens group G3 which comprises positive meniscus lens having a concave surface facing the object side, a biconcave lens, a biconvex lens, and a negative meniscus lens having a concave surface facing the object side.

Note that an aperture stop S is arranged between the first and second lens groups G1 and G2, as shown in FIG. 3.

FIG. 3 shows the positional relationship among the lens groups in an infinity state, and when focusing is effected to a short distance, the lens groups move on the optical axis along paths indicated by arrows in FIG. 1. Note that the third lens group G3 is fixed in position in the optical axis direction, and is appropriately moved in a direction substantially perpendicular to the optical axis by a vibration reduction mechanism 1 as the displacement means, thereby correcting a blur of an image caused by, e.g., a camera shake.

In the third embodiment, the present invention is applied to a photograph lens having a focal length larger than that of the first embodiment, and the third embodiment has substantially the same basic arrangement as that of the lens capable of a short distance photographing (close-up) of the first embodiment described above, except for the refracting powers and shapes of the lens groups, and the like.

Table 3 below summarizes data values of the third embodiment of the present invention. In Table 3, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, and n and v are respectively the refractive index and Abbe's number for the d-line (λ=587.6 nm).

TABLE 3 f = 105.0000
$F_{NO}$ = 2.80
2ω = = 23.14°

| | r | d | v | n |
|---|---|---|---|---|
| 1 | 74.5230 | 5.0000 | 49.44 | 1.77279 |
| 2 | -1424.0100 | 0.1500 | | |
| 3 | 28.6450 | 5.0000 | 50.28 | 1.72000 |
| 4 | 52.7010 | 2.0000 | | |
| 5 | 87.0120 | 2.0000 | 35.19 | 1.74950 |
| 6 | 24.5736 | (d6 = variable) | | |
| 7 | -32.5290 | 2.0000 | 31.15 | 1.68893 |
| 8 | 344.8550 | 10.5000 | 51.11 | 1.73350 |
| 9 | -41.8010 | 3.0000 | | |
| 10 | 178.0190 | 5.0000 | 53.76 | 1.69350 |
| 11 | -91.1694 | (d11 = variable) | | |
| 12 | -199.1380 | 4.0000 | 35.64 | 1.62588 |
| 13 | -55.6910 | 2.0000 | | |
| 14 | -114.2360 | 1.8000 | 45.52 | 1.79668 |
| 15 | 50.8710 | 1.8000 | | |
| 16 | 47.2130 | 6.0000 | 35.64 | 1.62588 |
| 17 | -234.3140 | 4.6000 | | |
| 18 | -38.3740 | 2.0000 | 39.59 | 1.80454 |
| 19 | -76.9281 | (Bf) | | |

(Variable Interval Upon Short Distance Focusing)

| f, β | 105.00000 | -0.50000 |
|---|---|---|
| d6 | 15.15181 | 21.84721 |
| d11 | 6.15144 | 32.39224 |
| Bf | 43.74657 | 43.74657 |

(Vibration Reduction Data)

| | Infinity | Photo-graphing Magnification (-½) |
|---|---|---|
| Moving Amount of Vibration Reduction Lens Group in Direction Perpendicular to Optical Axis | 1.20 | 1.20 |

TABLE 3-continued

| (mm) | | |
|---|---|---|
| Moving Amount of Image (mm) | −0.480 | −0.480 |

(The negative sign of the moving amount of an image indicates a direction opposite to the moving direction.)

(Condition Corresponding Values)

(1) |βM| = 0.500
(2) |fL|/f = 1.129
(3) ΔSL/|fL| = 0.0101
(4) βL = 1.400
(5) L/f = 0.211
(6) N− = 1.80454
(7) ν− = 39.61
(8) q− = −0.384
(9) q+ = −1.777
(10) νm = 35.19 (G1), 31.15 (G2)
(11) f1/f2 = 1.894

The fourth and fifth embodiments as the embodiments of the second mode of the present invention will be described below.

In each of these embodiments, a lens capable of a short distance photographing (close-up) with a vibration reduction function according to the second mode of the present invention, which comprises, in turn from the object side, a first lens group G1 having a positive refracting power and a second lens group G2 having a positive refracting power at the object side, and comprises a third lens group GL which is arranged at the most image side and serves as a last lens group having a negative refracting power, and in which the first and second lens groups G1 and G2 move toward the object side when focusing is effected from infinity to a short distance object, comprises a displacement means 1 for achieving vibration reduction by moving a partial lens group GLP having a negative refracting power in the third lens group (last lens group) GL in a direction substantially perpendicular to the optical axis.

[Fourth Embodiment]

Figure 4:
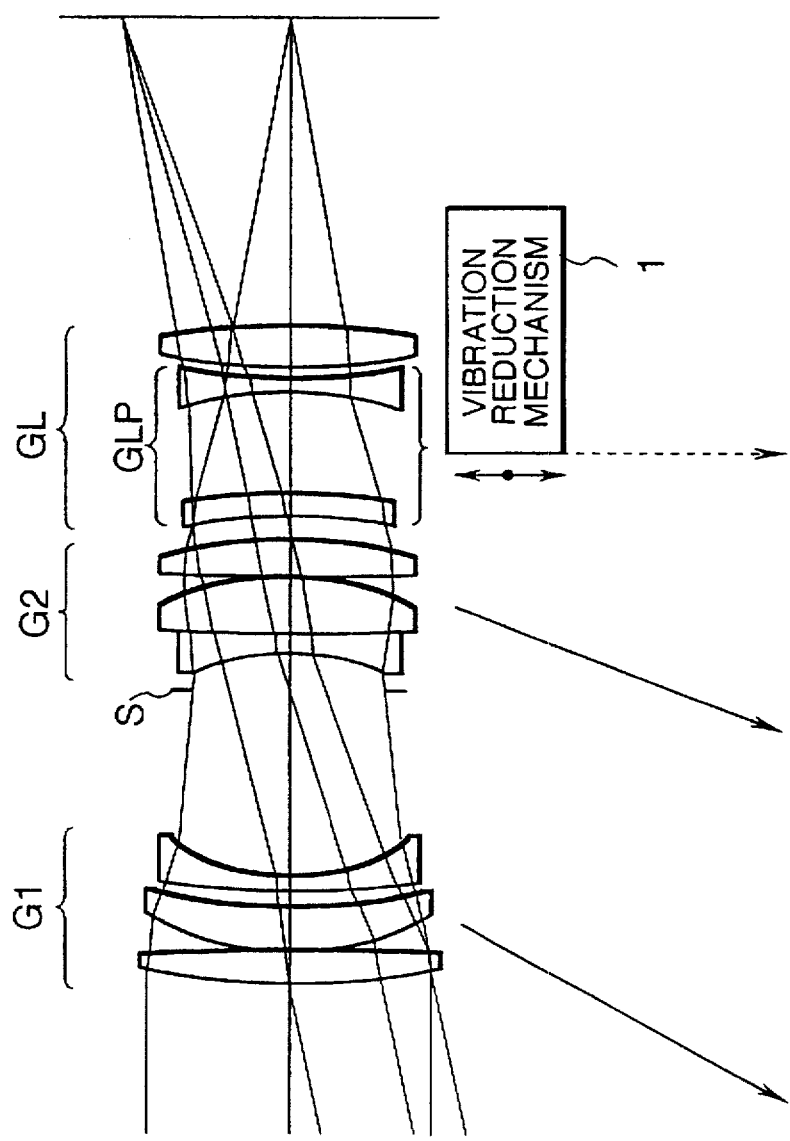
FIG. 4 is a view showing the arrangement of a lens capable of a short distance photographing (close-up) according to a fourth embodiment of the present invention.

FIG. 4 is a view showing the arrangement of a lens capable of a short distance photographing (close-up) according to the fourth embodiment of the present invention. The lens capable of a short distance photographing (close-up) shown in FIG. 4 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a negative meniscus lens having a concave surface facing the object side and a positive meniscus lens having a concave surface facing the object side, and a biconvex lens, and a third lens group GL which comprises a positive meniscus lens having a concave surface facing the object side, a biconcave lens, and a biconvex lens.

Note that of the third lens group GL, the positive meniscus lens having the concave surface facing the object side and the biconcave lens constitute a vibration reduction lens group GLP having a negative refracting power as a whole. Also, an aperture stop S is arranged between the first and second lens groups G1 and G2, as shown in FIG. 4.

FIG. 4 shows the positional relationship among the lens groups in an infinity photographing state, and when focusing is effected to a short distance, the lens groups move on the optical axis along paths indicated by arrows in FIG. 4. Note that the third lens group GL is fixed in position in the optical axis direction. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the fourth embodiment, the present invention is applied to a photograph lens having a relatively short focal length.

Table 4 below summarizes data values of the fourth embodiment of the present invention. In Table 4, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line (λ=587.6 nm), and n (G) is the refractive index for the g-line (λ=435.8 nm).

TABLE 4 f = 105
$F_{NO}$ = 2.86
2ω = 23.06°

| | r | d | ν | n(D) | n(G) |
|---|---|---|---|---|---|
| 1 | 89.1351 | 4.3000 | 55.60 | 1.69680 | 1.71232 |
| 2 | −825.4576 | 0.2000 | | | |
| 3 | 34.3250 | 6.0000 | 55.60 | 1.69680 | 1.71232 |
| 4 | 84.7777 | 2.0000 | | | |
| 5 | 177.7491 | 2.0000 | 35.70 | 1.62588 | 1.64852 |
| 6 | 26.8115 | (d6 = variable) | | | |
| 7 | −30.2229 | 2.0000 | 33.75 | 1.64831 | 1.67323 |
| 8 | −2217.9336 | 7.5000 | 53.75 | 1.69350 | 1.70959 |
| 9 | −38.6200 | 0.2000 | | | |
| 10 | 637.4222 | 4.3000 | 50.19 | 1.72000 | 1.73797 |
| 11 | −68.9166 | (d11 = variable) | | | |
| 12 | −91.5340 | 3.5000 | 25.50 | 1.80458 | 1.84631 |
| 13 | −57.7982 | 13.0298 | | | |
| 14 | −43.9910 | 2.0000 | 40.90 | 1.79631 | 1.82109 |
| 15 | 79.4290 | 1.5000 | | | |
| 16 | 80.0850 | 4.5000 | 49.52 | 1.74429 | 1.76323 |
| 17 | −111.5190 | (Bf) | | | |

(Variable Interval Upon Short Distance Focusing)

| f, β | 105.00000 | −0.50000 | −1.00000 |
|---|---|---|---|
| d6 | 29.60250 | 27.91740 | 26.26180 |
| d11 | 3.33120 | 37.03340 | 70.14590 |
| Bf | 42.15420 | 42.15420 | 42.15420 |

(Vibration Reduction Data)

| | Infinity | Photographing Magnification (−½) | Photographing Magnification (−1) |
|---|---|---|---|
| Moving Amount of Vibration Reduction Lens Group in Direction Perpendicular to Optical Axis (mm) | 0.80 | 0.80 | 0.80 |
| Moving Amount of Image (mm) | −0.752 | −0.752 | −0.752 |

(The negative sign of the moving amount of an image indicates a direction opposite to the moving direction.)

(Condition Corresponding Values)

βM = −1.0
f = 105.000

TABLE 4-continued

```
fL = -187.109
fLP = -46.723
f1 = 183.937
f2 = 85.879
D = 24.7
L = 18.5298
ΔSLP = 0.8
(1) |βM| = 1.0
(2) ΔSLP/|fLP|= 0.0171
(3) fLP/fL = 0.24971
(4) |fL|/f = 1.78199
(5) ΔSLP/D = 0.0324
(6) L/f = 0.176
(7) N- = 1.79631
(8) v- = 40.90
(9) vm = 33.75
(10) f1/f2 = 2.142
```

[Fifth Embodiment]

Figure 5:
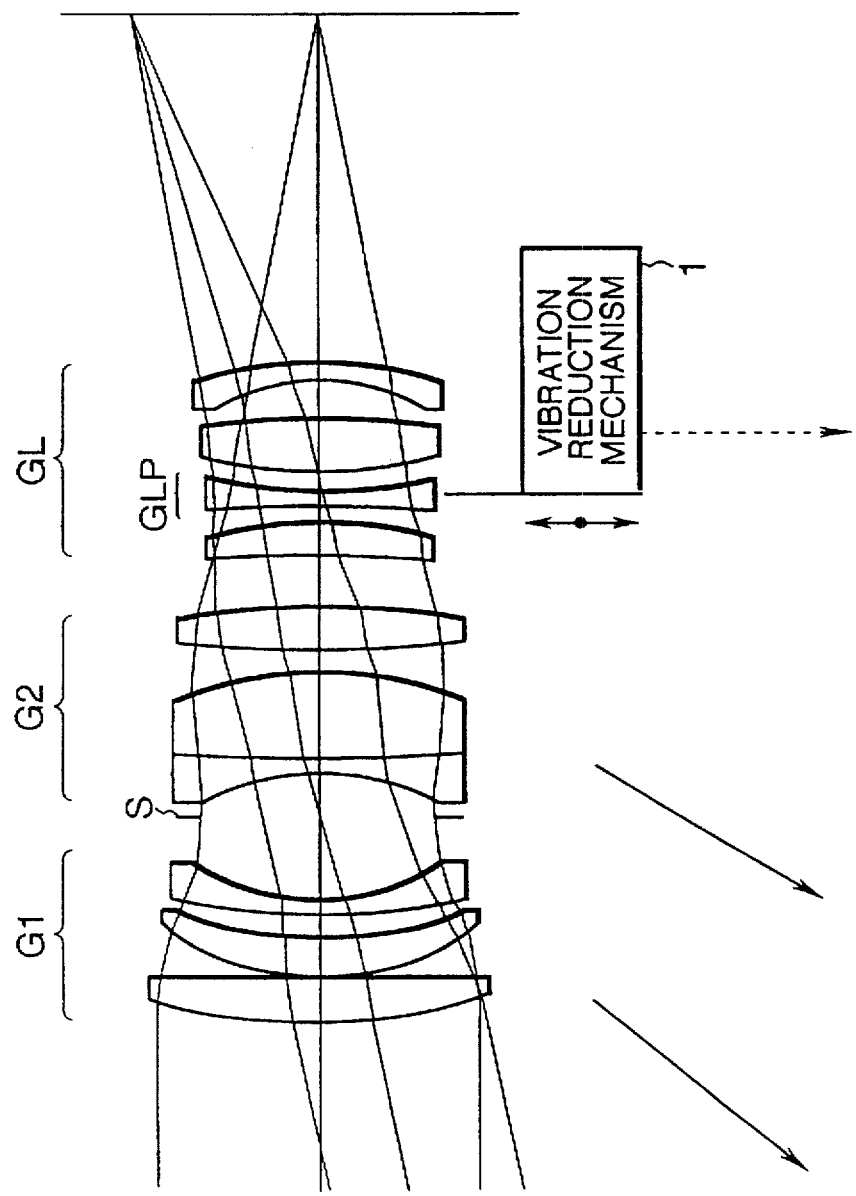
FIG. 5 is a view showing the arrangement of a lens capable of a short distance photographing (close-up) according to a fifth embodiment of the present invention.

FIG. 5 is a view showing the arrangement of a lens capable of a short distance photographing (close-up) according to the fifth embodiment of the present invention. The lens capable of a short distance photographing (close-up) shown in FIG. 5 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a biconcave lens and a biconvex lens, and a biconvex lens, and a third lens group GL which comprises a positive meniscus lens having a concave surface facing the object side, a biconcave lens, a biconvex lens and a meniscus lens having a concave surface facing the object side.

Note that of the third lens group GL, the biconcave lens constitutes a vibration reduction lens group GLP having a negative refracting power. Also, an aperture stop S is arranged between the first and second lens groups G1 and G2, as shown in FIG. 5.

FIG. 5 shows the positional relationship among the lens groups in an infinity photographing state, and when focusing is effected to a short distance, the lens groups move on the optical axis along paths indicated by arrows in FIG. 5. Note that the third lens group GL is fixed in position in the optical axis direction. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the fifth embodiment as well, the present invention is applied to a photograph lens having a relatively short focal length.

Table 5 below summarizes data values of the fifth embodiment of the present invention. In Table 5, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, n and v are respectively the refractive index and Abbe's number for the d-line (λ=587.6 nm), and n (G) is the refractive index for the g-line (λ=435.8 nm).

TABLE 5

```
f = 105.0000
F_NO = 2.80
2ω = 23.14°
```

| | r | d | v | n(D) | n(G) |
|---|---|---|---|---|---|
| 1 | 74.5230 | 5.0000 | 49.44 | 1.77279. | 1.79232 |
| 2 | -1424.0100 | 0.1500 | | | |
| 3 | 28.6450 | 5.0000 | 50.28 | 1.72000 | 1.73794 |
| 4 | 52.7010 | 2.0000 | | | |
| 5 | 87.0120 | 2.0000 | 35.19 | 1.74950 | 1.77694 |
| 6 | 24.5736 | (d6 = variable) | | | |
| 7 | -32.5290 | 2.0000 | 31.15 | 1.68893 | 1.71775 |
| 8 | 344.8550 | 10.5000 | 51.11 | 1.73350 | 1.75137 |
| 9 | -41.8010 | 3.0000 | | | |
| 10 | 178.0190 | 5.0000 | 53.76 | 1.69350 | 1.70961 |
| 11 | -91.1694 | (d11 = variable) | | | |
| 12 | -199.1380 | 4.0000 | 35.64 | 1.62588 | 1.64855 |
| 13 | -55.6910 | 2.0000 | | | |
| 14 | -114.2360 | 1.8000 | 45.52 | 1.79668 | 1.81874 |
| 15 | 50.8710 | 1.8000 | | | |
| 16 | 47.2130 | 6.0000 | 35.64 | 1.62588 | 1.64855 |
| 17 | -234.3140 | 4.6000 | | | |
| 18 | -38.3740 | 2.0000 | 39.59 | 1.80454 | 1.83041 |
| 19 | -76.9281 | (Bf) | | | |

(Variable Interval Upon Short Distance Focusing)

| f, β | 105.00000 | -0.50000 |
|---|---|---|
| d6 | 15.15181 | 21.84721 |
| d11 | 6.15144 | 32.39224 |
| Bf | 43.74657 | 43.74657 |

(Vibration Reduction Data)

| | Infinity | Photographing Magnification (-½) |
|---|---|---|
| Moving Amount of Vibration Reduction Lens Group in Direction Perpendicular to Optical Axis (mm) | 0.20 | 0.20 |
| Moving Amount of Image (mm) | -0.261 | -0.261 |

(The negative sign of the moving amount of an image indicates a direction opposite to the moving direction.)

(Condition Corresponding Values)

```
βM = -0.5
f = 105.000
fL = -118.525
fLP = -43.967
f1 = 153.000
f2 = 80.769
D = 24.52
L = 1.8
ΔSLP = 0.2
(1) |βM| = 0.5
(2) ΔSLP/|fLP|= 0.00455
(3) fLP/fL = 0.37095
(4) |fL|/f = 1.12881
(5) ΔSLP/D = 0.0082
(6) L/f = 0.0171
(7) N- = 1.79668
(8) v- = 45.52
(9) vm = 31.15
(10) f1/f2 = 1.894
```

The sixth and seventh embodiments as the embodiments of the third mode of the present invention will be described below.

In each of these embodiments, a lens capable of a short distance photographing (close-up), with a vibration reduction function according to the third mode of the present invention, which comprises, in turn from the object side, a first lens group G1 having a positive refracting power and a second lens group G2 having a negative refracting power at the object side, and comprises a third lens group GL which is arranged at the most image side and serves as a last lens group having a positive refracting power, and in which the interval between the first and second lens groups G1 and G2 increases when focusing is effected from infinity to a short distance object, comprises a displacement means 1 for achieving vibration reduction by moving a partial lens group GLP having a positive refracting power in the third lens group (last lens group) GL in a direction substantially perpendicular to the optical axis.

[Sixth Embodiment]

Figure 6:
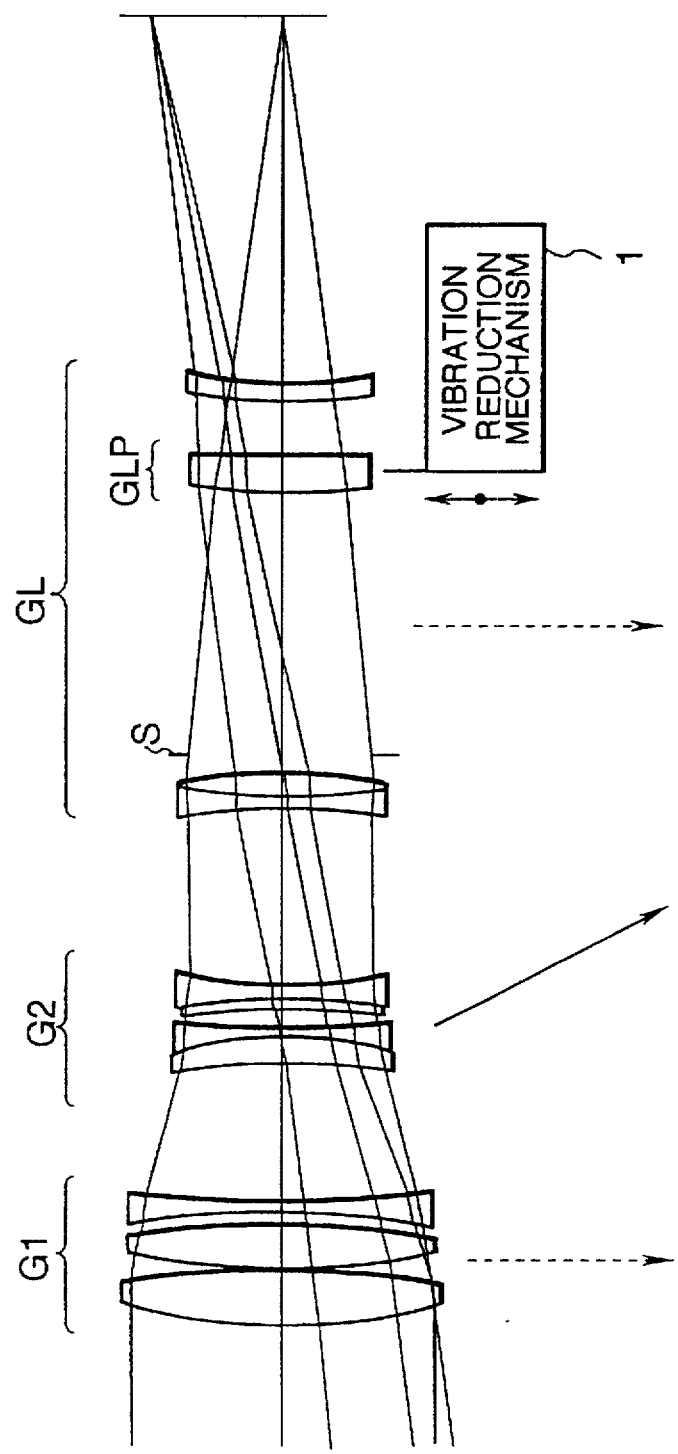
FIG. 6 is a view showing the arrangement of a lens capable of a short distance photographing (close-up) according to a sixth embodiment of the present invention.

FIG. 6 is a view showing the arrangement of a lens capable of a short distance photographing (close-up) according to the sixth embodiment of the present invention. The lens capable of a short distance photographing (close-up) shown in FIG. 6 is constituted by, in turn from the object side, a first lens group G1 which comprises a biconvex lens, a biconvex lens, and a biconcave lens, a second lens group G2 which comprises a cemented lens of a positive meniscus lens having a concave surface facing the object side and a biconcave lens, and a cemented lens of a positive meniscus lens having a concave surface facing the object side and a biconcave lens, and a third lens group GL which comprises a cemented lens of a biconcave lens and a biconvex lens, a positive meniscus lens having a convex surface facing the object side, and a negative meniscus lens having a convex surface facing the object side.

Note that of the third lens group GL, the positive meniscus lens having the convex surface facing the object side constitutes a vibration reduction lens group GLP having a positive refracting power. Also, an aperture stop S is arranged the third lens group GL, as shown in FIG. 6.

FIG. 6 shows the positional relationship among the lens groups in an infinity photographing state, and when focusing is effected to a short distance, the second lens group G2 moves on the optical axis along a path indicated by an arrow in FIG. 6. Note that the first and third lens groups G1 and GL are fixed in position in the optical axis direction. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the sixth embodiment, the present invention is applied to a photograph lens having a relatively long focal length.

Table 6 below summarizes data values of the sixth embodiment of the present invention. In Table 6, f is the focal length in the infinity state, $\beta$ is the photographing magnification at a short distance, $F_{NO}$ is the f-number in the infinity state, $2\omega$ is the field angle in the infinity state, and Bf is the back focus. Furthermore, numerals in the leftmost column represent the order of lens surfaces, r is the radius of curvature of each lens surface, d is the lens surface interval, n (D) and v are respectively the refractive index and Abbe's number for the d-line ($\lambda$=587.6 nm), and n (G) is the refractive index for the g-line ($\lambda$=435.8 nm).

TABLE 6

$f = 200$
$F_{NO} = 4.03$
$2\omega = 12.24°$

| | r | d | v | n(D) | n(G) |
|---|---|---|---|---|---|
| 1 | 106.1200 | 8.1000 | 69.98 | 1.52000 | 1.52908 |
| 2 | −244.4800 | 0.5000 | | | |
| 3 | 97.6400 | 8.5000 | 69.98 | 1.52000 | 1.52908 |
| 4 | −107.2300 | 0.7000 | | | |
| 5 | −103.7400 | 2.4000 | 30.04 | 1.69895 | 1.72942 |
| 6 | 1192.6899 | (d6 = variable) | | | |
| 7 | −110.5700 | 4.0000 | 28.34 | 1.72825 | 1.76206 |
| 8 | −55.6700 | 2.0000 | 64.10 | 1.51680 | 1.52667 |
| 9 | 210.7400 | 2.5000 | | | |
| 10 | −211.9600 | 2.0000 | 28.34 | 1.72825 | 1.76206 |
| 11 | −97.7000 | 2.0000 | 64.10 | 1.51680 | 1.52667 |
| 12 | 53.5071 | (d12 = variable) | | | |
| 13 | −140.6472 | 1.5000 | 35.51 | 1.59507 | 1.61681 |
| 14 | 84.3489 | 5.0000 | 58.54 | 1.61272 | 1.62571 |
| 15 | −58.5014 | 45.2000 | | | |
| 16 | 99.1934 | 6.0000 | 60.14 | 1.62041 | 1.63317 |
| 17 | 57107.6968 | 10.0000 | | | |
| 18 | 172.1229 | 2.5000 | 49.45 | 1.77279 | 1.79232 |
| 19 | 79.4832 | (Bf) | | | |

(Variable Interval Upon Short Distance Focusing)

| f, $\beta$ | 200.00000 | −0.50000 |
|---|---|---|
| d6 | 22.29075 | 47.29075 |
| d12 | 29.58233 | 4.58233 |
| Bf | 65.47270 | 65.47270 |

(Vibration Reduction Data)

| | Infinity | Photographing Magnification (−½) |
|---|---|---|
| Moving Amount of Vibration Reduction Lens Group in Direction Perpendicular to Optical Axis (mm) | 1.20 | 1.20 |
| Moving Amount of Image (mm) | −0.645 | 0.645 |

(The positive sign of the moving amount of an image indicates the same direction as the moving direction.)
(Condition Corresponding Values)

$\beta M = -0.5$
$f = 200.0$
$fL = 120.0$
$fLP = 160.156$
$f1 = 100.0$
$f2 = -60.0$
$WD = 499.076$
$\Delta = 25.0$
$L = 6.0$
(1) $|\beta M| = 0.5$
(2) $fL/f = 0.600$
(3) $\Delta SLP/fLP = 0.00750$
(4) $WD/f = 2.4954$
(5) $|\Delta|/f = 0.1250$
(6) $fLP/fL = 1.3346$
(7) $L/f = 0.03$
(8) $N+ = 1.62041$
(9) $v+ = 60.14$
(10) $f1/|f2| = 1.667$

[Seventh Embodiment]

Figure 7:
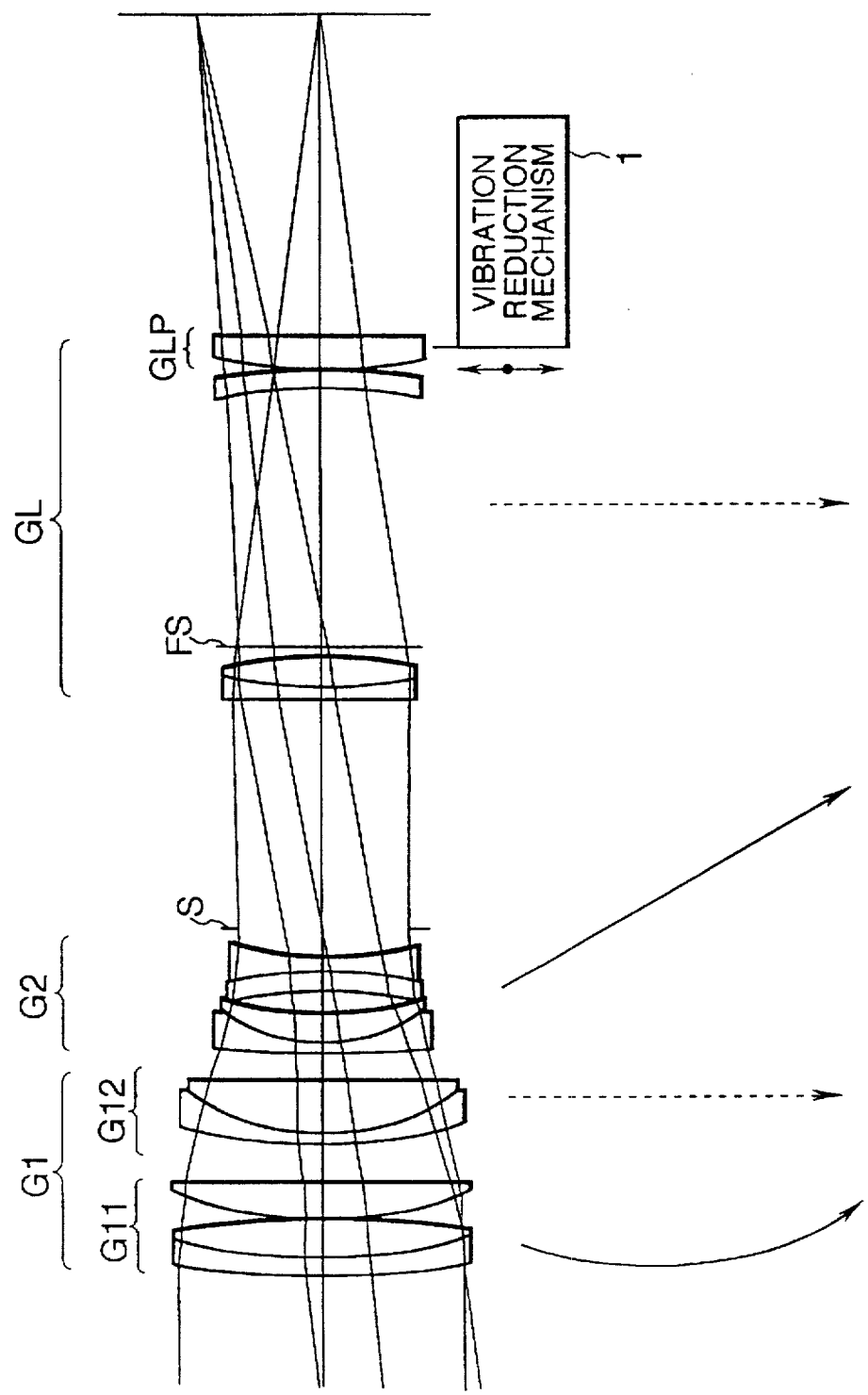
FIG. 7 is a view showing the arrangement of a lens capable of a short distance photographing (close-up) according to a seventh embodiment of the present invention.

FIG. 7 is a view showing the arrangement of a lens capable of a short distance photographing (close-up) according to the seventh embodiment of the present invention. The lens capable of a short distance photographing (close-up)

shown in FIG. 7 is constituted by, in turn from the object side, a first lens group G1 which comprises a cemented lens of a negative meniscus lens having a convex surface facing the object side and a biconvex lens, a positive meniscus lens having a convex surface facing the object side, and a cemented lens of a negative meniscus lens having a convex surface facing the object side and a positive meniscus lens having a convex surface facing the object side, a second lens group G2 which comprises a cemented lens of a negative meniscus lens having a convex surface facing the object side and a positive meniscus lens having a convex surface facing the object side, and a cemented lens of a positive meniscus lens having a concave surface facing the object side and a biconcave lens, and a third lens group GL which comprises a cemented lens of a negative meniscus lens having a convex surface facing the object side and a biconvex lens, a negative meniscus lens having a concave surface facing the object side, and a positive meniscus lens having a convex surface facing the object side.

Note that of the third lens group GL, the positive meniscus lens having the convex surface facing the object side constitutes a vibration reduction lens group GLP having a positive refracting power. Also, an aperture stop S is arranged between the second and third lens groups G2 and GL, and a stationary flare stop FS is arranged in the third lens group GL, as shown in FIG. 7.

Of the first lens group G1, the cemented lens of the negative meniscus lens having the convex surface facing the object side and the biconvex lens, and the positive meniscus lens having the convex surface facing the object side constitute a front group G11, and the cemented lens of the negative meniscus lens having the convex surface facing the object side and the positive meniscus lens having the convex surface facing the object side constitutes a rear group G12.

FIG. 7 shows the positional relationship among the lens groups in an infinity photographing state, and when focusing is effected to a short distance, the front group G11 of the first lens group G1 and the second lens group G2 move on the optical axis along paths indicated by arrows in FIG. 7. Note that the rear group G12 of the first lens group and the third lens group GL are fixed in position in the optical axis direction. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the seventh embodiment as well, the present invention is applied to a photograph lens having a relatively long focal length.

Table 7 below summarizes data values of the seventh embodiment of the present invention. In Table 7, f is the focal length in the infinity state, β is the photographing magnification at a short distance, $F_{NO}$ is the f-number in the infinity state, 2ω is the field angle in the infinity state, and Bf is the back focus. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm), and n (G) is the refractive index for the g-line (λ=435.8 nm).

TABLE 7 f = 199.997
$F_{NO}$ = 4.00
2ω = 12.32°

| | r | d | ν | n(D) | n(G) |
|---|---|---|---|---|---|
| 1 | 197.7383 | 2.5000 | 33.89 | 1.80384 | 1.83464 |
| 2 | 85.6098 | 7.0000 | 82.52 | 1.49782 | 1.50527 |
| 3 | −206.2828 | 0.3000 | | | |
| 4 | 71.6067 | 6.0000 | 82.52 | 1.49782 | 1.50527 |
| 5 | 431.0537 | (d5 = variable) | | | |
| 6 | 79.0168 | 2.5000 | 40.90 | 1.79631 | 1.82107 |
| 7 | 39.9554 | 8.8000 | 60.64 | 1.60311 | 1.61540 |
| 8 | 478.7420 | (d8 = variable) | | | |
| 9 | 196.4322 | 2.0000 | 57.03 | 1.62280 | 1.63639 |
| 10 | 31.4573 | 5.0000 | 33.89 | 1.80384 | 1.83464 |
| 11 | 62.3232 | 3.7000 | | | |
| 12 | −105.6139 | 4.0000 | 25.41 | 1.80518 | 1.84731 |
| 13 | −58.9450 | 2.0000 | 60.14 | 1.62041 | 1.63317 |
| 14 | 49.1628 | (d14 = variable) | | | |
| 15 | 1206.1834 | 2.0000 | 31.08 | 1.68893 | 1.71783 |
| 16 | 69.6055 | 6.0000 | 60.14 | 1.62041 | 1.63317 |
| 17 | −59.1728 | 46.5000 | | | |
| 18 | −72.7684 | 2.5000 | 49.45 | 1.77279 | 1.79232 |
| 19 | −436.1421 | 0.4000 | | | |
| 20 | 86.7935 | 6.0000 | 45.87 | 1.54814 | 1.56328 |
| 21 | 799.3808 | (Bf) | | | |

(Variable Interval Upon Short Distance Focusing)

| f, β | 199.99700 | −0.50000 | −1.00000 |
|---|---|---|---|
| d5 | 6.64330 | 14.20990 | 6.64330 |
| d8 | 5.14048 | 17.75138 | 37.14078 |
| d14 | 45.12495 | 32.51405 | 13.12465 |
| Bf | 58.80870 | 58.80870 | 58.80870 |

(Vibration Reduction Data)

| | Infinity | Photographing Magnification (−½) | Photographing Magnification (−1) |
|---|---|---|---|
| Moving Amount of Vibration Reduction Lens Group in Direction Perpendicular to Optical Axis (mm) | 1.00 | 1.00 | 1.00 |
| Moving Amount of Image (mm) | 0.566 | 0.566 | 0.566 |

(The positive sign of the moving amount of an image indicates the same direction as the moving direction.)
(Condition Corresponding Values)

βM = −1.0
f = 200.0
fL = 120.0
fLP = 177.100
f1 = 80.000
f2 = −48.0
WD = 272.364
Δ = 32.0
L = 6.0
(1) |βM| = 1.0
(2) fL/f = 0.600
(3) ΔSLP/fLP = 0.00565
(4) WD/f = 1.3618
(5) |Δ|/f = 0.16
(6) fLP/fL = 1.4758
(7) L/f = 0.03
(8) N+ = 1.54814
(9) ν+ = 45.87
(10) f1/|f2| = 1.667

The eighth and ninth embodiments as the embodiments of the fourth mode of the present invention will be described below.

In each of these embodiments, a lens capable of a short distance photographing with a vibration reduction function according to the present invention comprises a first lens group G1 having a positive refracting power at the most object side, a second lens group G2 having a negative refracting power at the image side of the first lens group G1, and a last lens group GL having a positive refracting power at the most image side. The interval between the first and second lens groups G1 and G2 increases when focusing is effected from infinity to a short distance object. The lens comprises a displacement means 1 for attaining vibration reduction by moving a partial lens group GLP having a negative refracting power as part of the last lens group GL in a direction substantially perpendicular to the optical axis.

[Eighth Embodiment]

Figure 8:
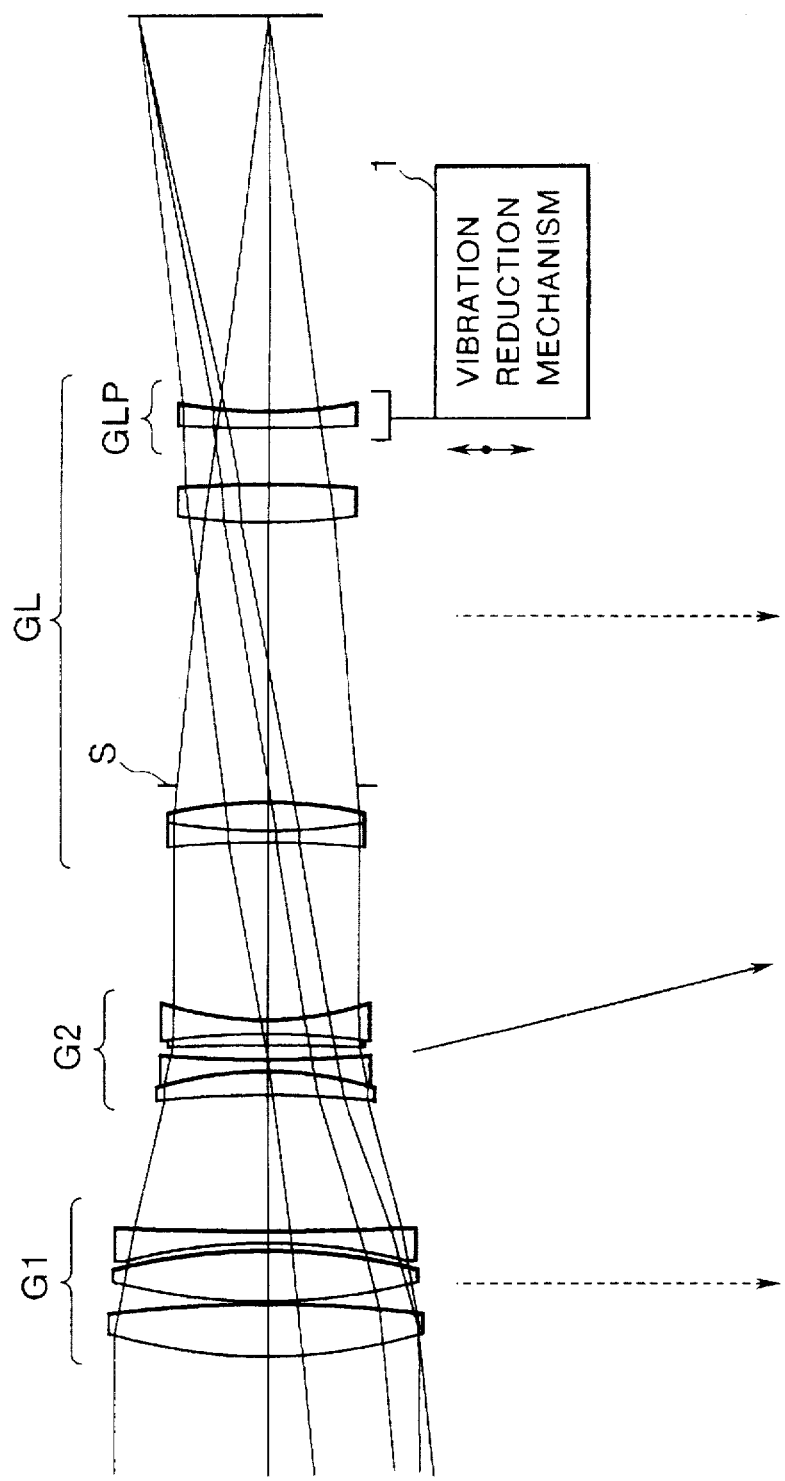
FIG. 8 is a view showing the arrangement of a lens capable of a short distance photographing according to an eighth embodiment of the present invention.

FIG. 8 is a view showing the arrangement of a lens capable of a short distance photographing according to the eighth embodiment of the present invention. The lens capable of a short distance photographing shown in FIG. 8 is constituted by, in turn from the object side, a first lens group G1 which comprises a biconvex lens, a biconvex lens, and a biconcave lens, a second lens group G2 which comprises a cemented lens of a negative meniscus lens having a concave surface facing the object side and a biconcave lens, and a cemented lens of a negative meniscus lens having a concave surface facing the object side and a biconcave lens, and a last or third lens group GL which comprises a cemented lens of a biconcave lens and a biconvex lens, a positive meniscus lens having a convex surface facing the object side, and a negative meniscus lens having a convex surface facing the object side.

Note that of the third lens group GL, the negative meniscus lens having the convex surface facing the object side constitutes a vibration reduction lens group GLP. Also, an aperture stop S is arranged in the third lens group GL, as shown in FIG. 8.

FIG. 8 shows the positional relationship among the lens groups in an infinity photographing state, and when focusing is effected to a short distance object, the second lens group G2 moves on the optical axis along a path indicated by an arrow in FIG. 8. Note that the first and third lens groups G1 and GL are fixed in position in the optical axis direction during focusing. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the eighth embodiment, the present invention is applied to a photograph lens having a relatively long focal length.

Table 8 below summarizes data values of the eighth embodiment of the present invention. In Table 8, f is the focal length in the infinity photographing state, β is the photographing magnification in a short distance photographing state, $F_{NO}$ is the f-number in the infinity photographing state, $2\omega$ is the field angle in the infinity photographing state, and Bf is the back focus. Furthermore, numerals in the leftmost column represent the order of lens surfaces from the object side, r is the radius of curvature of each lens surface, d is the lens surface interval, n (D) and v are respectively the refractive index and Abbe's number for the d-line ($\lambda$=587.6 nm), and n (G) is the refractive index for the g-line ($\lambda$=435.8 nm).

TABLE 8 f = 200
$F_{NO}$ = 4.03
$2\omega$ = 12.2°

| | r | d | v | n(D) | n(G) |
|---|---|---|---|---|---|
| 1 | 106.1200 | 8.1000 | 70.08 | 1.52000 | 1.52908 |
| 2 | −244.4800 | 0.5000 | | | |
| 3 | 97.6400 | 8.5000 | 70.08 | 1.52000 | 1.52908 |
| 4 | −107.2300 | 0.7000 | | | |
| 5 | −103.7400 | 2.4000 | 30.05 | 1.69895 | 1.72942 |
| 6 | 1192.6898 | (d6 = variable) | | | |
| 7 | −110.5700 | 4.0000 | 28.34 | 1.72825 | 1.76206 |
| 8 | −55.6700 | 2.0000 | 64.20 | 1.51680 | 1.52667 |
| 9 | 210.7400 | 2.5000 | | | |
| 10 | −211.9600 | 2.0000 | 28.34 | 1.72825 | 1.76206 |
| 11 | −97.7000 | 2.0000 | 64.20 | 1.51680 | 1.52667 |
| 12 | 53.5071 | (d12 = variable) | | | |
| 13 | −140.6472 | 1.5000 | 35.59 | 1.59507 | 1.61681 |
| 14 | 84.3489 | 5.0000 | 58.54 | 1.61272 | 1.62571 |
| 15 | −58.5014 | 45.2000 | | | |
| 16 | 99.1934 | 6.0000 | 60.14 | 1.62041 | 1.63317 |
| 17 | 57107.6970 | 10.0000 | | | |
| 18 | 172.1229 | 2.5000 | 49.45 | 1.77279 | 1.79232 |
| 19 | 79.4832 | (Bf) | | | |

(Variable Interval Upon Short Distance Focusing)

| f, β | 200.0000 | −0.50000 |
|---|---|---|
| d6 | 22.29075 | 47.29075 |
| d12 | 29.58233 | 4.58233 |
| Bf | 65.4727 | 65.4727 |

(Vibration Reduction Data)

| | Infinity | Photographing Magnification (−½) |
|---|---|---|
| Moving Amount of Vibration Reduction Lens Group in Direction Perpendicular to Optical Axis (mm) | 1.50 | 1.50 |
| Moving Amount of Image (mm) | −0.498 | −0.498 |

(The negative sign of the moving amount of an image indicates a direction opposite to the moving direction of the lens.)
(Condition Corresponding Values)

βM = −0.5
f = 200.0
fL = 120.0
fLP = −474.9
f1 = 100.0
f2 = −60.0
WD = 499.076
Δ = 25.0
L = 6.0
(1) |βM| = 0.5
(2) fL/f = 0.6
(3) |ΔSLP/fLP| = 0.0032
(4) WD/f = 2.4954
(5) Δ/f = 0.1250
(6) |fLPI/fL = 3.958
(7) L/f = 0.03
(8) N− = 1.77279
(9) v− = 49.5
(10) f1/|f2| = 1.667

[Ninth Embodiment]

Figure 9:
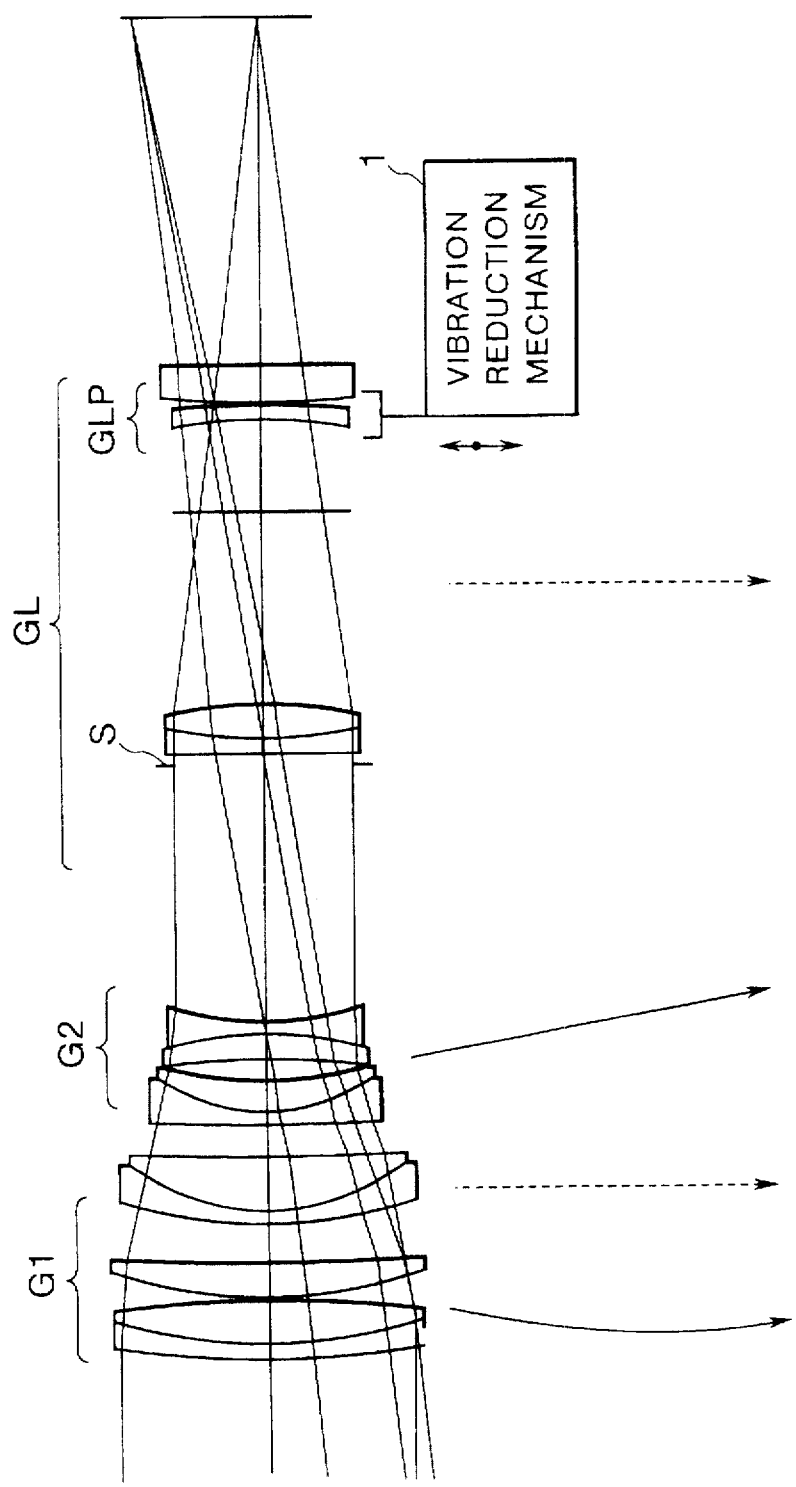
FIG. 9 is a view showing the arrangement of a lens capable of a short distance photographing according to a ninth embodiment of the present invention.

FIG. 9 is a view showing the arrangement of a lens capable of a short distance photographing according to the ninth embodiment of the present invention. The lens capable of a short distance photographing shown in FIG. 9 is constituted by, in turn from the object side, a first lens group G1 which comprises a cemented lens of a negative meniscus lens having a convex surface facing the object side and a biconvex lens, a positive meniscus lens having a convex surface facing the object side, and a cemented lens of a negative meniscus lens having a convex surface facing the object side and a positive meniscus lens having a convex surface facing the object side, a second lens group G2 which comprises a cemented lens of a negative meniscus lens having a convex surface facing the object side and a positive meniscus lens having a convex surface facing the object side, and a cemented lens of a positive meniscus lens having a concave surface facing the object side and a biconcave lens, and a third lens group GL which comprises a cemented lens of a negative meniscus lens having a convex surface facing the object side and a biconvex lens, a negative meniscus lens having a concave surface facing the object side, and a positive meniscus lens having a convex surface facing the object side.

Note that of the third lens group GL, the negative meniscus lens having the concave surface facing the object side constitutes a vibration reduction lens group GLP. Also, an aperture stop S is arranged between the second and third lens groups G2 and GL, and a flare stop FS is arranged in the third lens group GL, as shown in FIG. 9.

FIG. 9 shows the positional relationship among the lens groups in an infinity photographing state, and when focusing is effected to a short distance object, the front group of the first lens group G1 and the second lens group G2 move on the optical axis along paths indicated by arrows in FIG. 9. Note that the rear group of the first lens group and the third lens group GL are fixed in position in the optical axis direction during focusing. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the ninth embodiment as well, the present invention is applied to a photograph lens having a relatively long focal length.

Table 9 below summarizes data values of the ninth embodiment of the present invention. In Table 9, f is the focal length in the infinity photographing state, $\beta$ is the photographing magnification in a short distance photographing state, $F_{NO}$ is the f-number in the infinity photographing state, $2\omega$ is the field angle in the infinity photographing state, and Bf is the back focus. Furthermore, numerals in the leftmost column represent the order of lens surfaces from the object side, r is the radius of curvature of each lens surface, d is the lens surface interval, n (D) and ν are respectively the refractive index and Abbe's number for the d-line ($\lambda$=587.6 nm), and n (G) is the refractive index for the g-line ($\lambda$=435.8 nm).

TABLE 9 f = 200
$F_{NO}$ = 4.07
$2\omega$ = 12.23°

| | r | d | ν | n(D) | n(G) |
|---|---|---|---|---|---|
| 1 | 197.73830 | 2.50000 | 33.89 | 1.80384 | 1.83464 |
| 2 | 85.60980 | 7.00000 | 82.52 | 1.49782 | 1.50527 |
| 3 | −206.28280 | 0.30000 | | | |
| 4 | 71.60670 | 6.00000 | 82.52 | 1.49782 | 1.50527 |
| 5 | 431.05366 | (d5 = variable) | | | |

TABLE 9-continued

| 6 | 79.01680 | 2.50000 | 40.90 | 1.79631 | 1.82107 |
|---|---|---|---|---|---|
| 7 | 39.95540 | 8.80000 | 60.64 | 1.60311 | 1.61540 |
| 8 | 478.74200 | (d8 = variable) | | | |
| 9 | 196.43220 | 2.00000 | 57.03 | 1.62280 | 1.63639 |
| 10 | 31.45730 | 5.00000 | 33.89 | 1.80384 | 1.83464 |
| 11 | 62.32320 | 3.70000 | | | |
| 12 | −105.61390 | 4.00000 | 25.41 | 1.80518 | 1.84731 |
| 13 | −58.94500 | 2.00000 | 60.14 | 1.62041 | 1.63317 |
| 14 | 49.16280 | (d14 = variable) | | | |
| 15 | 1206.18340 | 2.00000 | 31.08 | 1.68893 | 1.71783 |
| 16 | 69.60550 | 6.00000 | 60.14 | 1.62041 | 1.63317 |
| 17 | −59.17280 | 46.50000 | | | |
| 18 | −72.76840 | 2.50000 | 49.45 | 1.77279 | 1.79232 |
| 19 | −436.14210 | 0.40000 | | | |
| 20 | 86.79350 | 6.00000 | 45.87 | 1.54814 | 1.56328 |
| 21 | 799.37974 | (Bf) | | | |

| (Variable Interval Upon Short Distance Focusing) | | | |
|---|---|---|---|
| f, $\beta$ | 199.99680 | −0.50000 | −1.00000 |
| d5 | 6.64330 | 14.20990 | 6.64330 |
| d8 | 5.14048 | 17.75138 | 37.14078 |
| d14 | 45.12496 | 32.51406 | 13.12466 |
| Bf | 58.809 | 58.809 | 58.809 |

| (Vibration Reduction Data) | | | |
|---|---|---|---|
| | Infinity | Photographing Magnification (−½) | Photographing Magnification (−1) |
| Moving Amount of Vibration Reduction Lens Group in Direction Perpendicular to Optical Axis (mm) | 0.70 | 0.70 | 0.70 |
| Moving Amount of Image (mm) | −0.396 | −0.396 | −0.396 |

(The negative sign of the moving amount of an image indicates a direction opposite to the moving direction of the lens.)
(Condition Corresponding Values)

$\beta M$ = −1.0
f = 200.0
fL = 120.0
fLP = −113.36
f1 = 80.0
f2 = −48.0
WD = 272.364
$\Delta$ = 32.0
L = 6.0
(1) |$\beta M$| = 1.0
(2) fL/f = 0.600
(3) $\Delta$SLP/|fLP| = 0.0062
(4) WD/f = 1.3618
(5) $\Delta$/f = 0.16
(6) |fLP|/fL = 0.945
(7) L/f = 0.03
(8) N− = 1.77279
(9) ν− = 49.5
(10) |f1/f2| = 1.667

The 10th and 11th embodiments as the embodiments of the fifth mode of the present invention will be described below.

In each of these embodiments, a lens capable of a short distance photographing with a vibration reduction function according to the present invention comprises in turn from the object side, a first lens group G1 having a positive refracting power, a second lens group G2 having a positive refracting power, and a last lens group GL having a negative refracting power at the most image side. The first and second lens groups G1 and G2 move when focusing is effected from infinity to a short distance object. The lens comprises a displacement means 1 for attaining vibration reduction by moving a partial lens group GLP having a positive refracting power as part of the last lens group GL in a direction substantially perpendicular to the optical axis.

[10th Embodiment]

FIG. 10 is a view showing the arrangement of a lens capable of a short distance photographing according to the 10th embodiment of the present invention. The lens capable of a short distance photographing shown in FIG. 10 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a negative meniscus lens having a concave surface facing the object side and a positive meniscus lens having a concave surface facing the object side, and a biconvex lens, and a third lens group GL which comprises a positive meniscus lens having a concave surface facing the object side, a biconcave lens, a biconvex lens, and a negative meniscus lens having a concave surface facing the object side.

Note that of the third lens group GL, the biconvex lens constitutes a vibration reduction lens group GLP. Also, an aperture stop S is arranged between the first and second lens groups G1 and G2, as shown in FIG. 10.

FIG. 10 shows the positional relationship among the lens groups in an infinity photographing state, and when focusing is effected to a short distance object, the first and second lens groups G1 and G2 move on the optical axis along paths indicated by arrows in FIG. 10. Note that the third lens group GL is fixed in position in the optical axis direction during focusing. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the 10th embodiment, the present invention is applied to a photograph lens having a relatively short focal length.

Table 10 below summarizes data values of the 10th embodiment of the present invention. In Table 10, f is the focal length in the infinity photographing state, β is the photographing magnification in a short distance photographing state, $F_{NO}$ is the f-number in the infinity photographing state, 2ω is the field angle in the infinity photographing state, and Bf is the back focus.

Furthermore, numerals in the leftmost column represent the order of lens surfaces from the object side, r is the radius of curvature of each lens surface, d is the lens surface interval, n (D) and v are respectively the refractive index and Abbe's number for the d-line (λ=587.6 nm), and n (G) is the refractive index for the g-line (λ=435.8 nm).

TABLE 10 f = 105
$F_{NO}$ = 2.86
2ω = 23.1°

| | r | d | v | n(D) | n(G) |
|---|---|---|---|---|---|
| 1 | 89.1351 | 4.3000 | 55.60 | 1.69680 | 1.71232 |
| 2 | −825.4576 | 0.2000 | | | |
| 3 | 34.3250 | 6.0000 | 55.60 | 1.69680 | 1.71232 |
| 4 | 84.7777 | 2.0000 | | | |
| 5 | 177.7491 | 2.0000 | 35.70 | 1.62588 | 1.64852 |

TABLE 10-continued

| | | | | | |
|---|---|---|---|---|---|
| 6 | 26.8115 | (d6 = variable) | | | |
| 7 | −30.2229 | 2.0000 | 33.75 | 1.64831 | 1.67323 |
| 8 | −2217.9336 | 7.5000 | 53.75 | 1.69350 | 1.70959 |
| 9 | −38.6200 | 0.2000 | | | |
| 10 | 637.4222 | 4.3000 | 50.19 | 1.72000 | 1.73797 |
| 11 | −68.9166 | (d11 = variable) | | | |
| 12 | −78.6995 | 3.5000 | 25.50 | 1.80458 | 1.84631 |
| 13 | −53.1971 | 13.2122 | | | |
| 14 | −41.0458 | 2.0000 | 40.90 | 1.79631 | 1.82107 |
| 15 | 219.6269 | 1.5618 | | | |
| 16 | 179.0941 | 4.5000 | 49.52 | 1.74443 | 1.76323 |
| 17 | −80.8457 | 1.0000 | | | |
| 18 | −107.7394 | 1.5000 | 43.35 | 1.84042 | 1.86492 |
| 19 | −148.5156 | (Bf) | | | |

(Variable Interval Upon Short Distance Focusing)

| f, β | 105.00000 | −0.50000 | −1.00000 |
|---|---|---|---|
| d6 | 29.60251 | 27.91741 | 26.26181 |
| d11 | 3.81331 | 37.51551 | 70.62801 |
| Bf | 39.6833 | 39.6833 | 39.6833 |

(Vibration Reduction Data)

| | Infinity | Photographing Magnification (−½) | Photographing Magnification (−1) |
|---|---|---|---|
| Moving Amount of Vibration Reduction Lens Group in Direction Perpendicular to Optical Axis (mm) | 0.70 | 0.70 | 0.70 |
| Moving Amount of Image (mm) | +0.393 | +0.393 | +0.393 |

(The positive sign of the moving amount of an image indicates the same direction as the moving direction of the lens.)
(Condition Corresponding Values)

βM = −1.0
f = 105.000
fL = −187.109
fLP = 75.381
f1 = 183.937
f2 = 85.879
D = 29.2
L = 4.5
(1) |βM| = 1.0
(2) ΔSLP/fLP = 0.0093
(3) fLP/|fL| = 0.403
(4) |fL|/f = 1.782
(5) ΔSLP/D = 0.024
(6) L/f = 0.043
(7) N+ = 1.7443
(8) v+ = 49.52
(9) vm (first lens group) = 35.70
(9) vm (second lens group) = 33.75
(10) f1/f2 = 2.142

[11th Embodiment]

FIG. 11 is a view showing the arrangement of a lens capable of a short distance photographing according to the 11th embodiment of the present invention. The lens capable of a short distance photographing shown in FIG. 11 is constituted by, in turn from the object side, a first lens group G1 which comprises a biconvex lens, a positive meniscus lens having a convex surface facing the object side, and a negative meniscus lens having a convex surface facing the object side, a second lens group G2 which comprises a cemented lens of a biconcave lens and a biconvex lens, and a biconvex lens, and a third lens group GL which comprises a positive meniscus lens having a concave surface facing the object side, a biconcave lens, a biconvex lens, and a negative meniscus lens having a concave surface facing the object side.

Note that of the third lens group GL, the biconvex lens constitutes a vibration reduction lens group GLP. Also, an aperture stop S is arranged between the first and second lens groups G1 and G2, as shown in FIG. 11.

FIG. 11 shows the positional relationship among the lens groups in an infinity photographing state, and when focusing is effected to a short distance object, the first and second lens groups G1 and G2 move on the optical axis along paths indicated by arrows in FIG. 11. Note that the third lens group GL is fixed in position in the optical axis direction during focusing. The vibration reduction lens group GLP as a partial lens group of the third lens group GL is appropriately moved in a direction substantially perpendicular to the optical axis by a vibration reduction mechanism 1 as the displacement means, thereby correcting a blur of an image caused by, e.g., a camera shake.

In the 11th embodiment as well, the present invention is applied to a photograph lens having a relatively short focal length.

Table 11 below summarizes data values of the 11th embodiment of the present invention. In Table 11, f is the focal length in the infinity photographing state, β is the photographing magnification in a short distance photographing state, $F_{NO}$ is the f-number in the infinity photographing state, 2ω is the field angle in the infinity photographing state, and Bf is the back focus. Furthermore, numerals in the leftmost column represent the order of lens surfaces from the object side, r is the radius of curvature of each lens surface, d is the lens surface interval, n (D) and ν are respectively the refractive index and Abbe's number for the d-line (λ=587.6 nm), and n (G) is the refractive index for the g-line (λ=435.8 nm).

TABLE 11

| | f = 105 | | | |
| | $F_{NO}$ = 2.80 | | | |
| | 2ω = 23.14° | | | |

| | r | d | ν | n(D) | n(G) |
|---|---|---|---|---|---|
| 1 | 74.5230 | 5.0000 | 49.45 | 1.77279 | 1.79232 |
| 2 | −1424.0100 | 0.1500 | | | |
| 3 | 28.6450 | 5.0000 | 50.19 | 1.72000 | 1.73794 |
| 4 | 52.7010 | 2.0000 | | | |
| 5 | 78.0120 | 2.0000 | 35.19 | 1.74950 | 1.77694 |
| 6 | 24.5736 | (d6 = variable) | | | |
| 7 | −32.5290 | 2.0000 | 31.08 | 1.68893 | 1.71775 |
| 8 | 344.8550 | 10.5000 | 51.09 | 1.73350 | 1.75137 |
| 9 | −41.8010 | 3.0000 | | | |
| 10 | 178.0190 | 5.0000 | 53.75 | 1.69350 | 1.70961 |
| 11 | −91.1694 | (d11 = variable) | | | |
| 12 | −199.1380 | 4.0000 | 35.70 | 1.62588 | 1.64855 |
| 13 | −55.6910 | 2.0000 | | | |
| 14 | −114.2360 | 1.8000 | 45.37 | 1.79668 | 1.81874 |
| 15 | 50.8710 | 1.8000 | | | |
| 16 | 47.2130 | 6.0000 | 35.70 | 1.62588 | 1.64855 |
| 17 | −234.3140 | 4.6000 | | | |
| 18 | −38.3740 | 2.0000 | 39.61 | 1.80454 | 1.83041 |
| 19 | −76.9281 | (Bf) | | | |

| (Variable Interval Upon Short Distance Focusing) | | |
|---|---|---|
| f, β | 105.00000 | −0.50000 |
| d6 | 15.15181 | 21.84721 |
| d11 | 6.15144 | 32.39224 |
| Bf | 43.7466 | 43.7466 |

TABLE 11-continued

| (Vibration Reduction Data) | | |
|---|---|---|
| | Infinity | Photographing Magnification (−½) |
| Moving Amount of Vibration Reduction Lens Group in Direction Perpendicular to Optical Axis (mm) | 0.35 | 0.35 |
| Moving Amount of Image (mm) | +0.308 | +0.308 |

(The positive sign of the moving amount of an image indicates the same direction as the moving direction of the lens.)
(Condition Corresponding Values)

βM = −0.5
f = 105.000
fL = −118.525
fLP = 63.303
f1 = 153.000
f2 = 80.769
D = 26.2
L = 6.0
(1) |βM| = 0.5
(2) ΔSLP/fLP = 0.0055
(3) fLP/|fL| = 0.534
(4) |fL|/f = 1.129
(5) ΔSLP/D = 0.013
(6) L/f = 0.057
(7) N+ = 1.62588
(8) ν+ = 35.7
(9) νm (first lens group) = 35.19
(9) νm (second lens group) = 31.08
(10) f1/f2 = 1.894

As described above, according to the present invention, a lens capable of a short distance photographing (close-up), which comprises a vibration reduction function, has a relatively long focal length, and is suitable for, e.g., a photograph, video image, and the like, can be provided.

For this reason, the lens allows a hand-held photographing operation, and is very convenient for an actual photographing operation. In addition, the lens realizes a photographing operation under a vibration condition caused by, e.g., a camera shake with good imaging performance.

What is claimed is:

1. A lens system capable of a short distance photographing, which satisfies:

|βM|>0.25 (βM is the photographing magnification at a shortest photographing distance)

said lens system comprising:

a plurality of lens groups respectively having positive or negative refracting powers, wherein at least two intervals between two neighboring lens groups change for focusing, and at least a partial lens group, located at an image side of a lens group which is movable for focusing, is a vibration reduction lens group which is movable in a direction substantially perpendicular to an optical axis;

wherein said plurality of lens groups include, in turn from an object side, a first lens group having a positive refracting power, a second lens group having a positive refracting power, and a last lens group which is arranged at the most image side and has a negative refracting power, and when focusing is effected from infinity to a short distance object, said first and second lens groups move toward the object side, and a partial lens group constituting said last lens group and having a negative refracting power constitutes said vibration reduction lens group; and wherein said lens system satisfies:

$$\Delta SLP/|fLP|<0.1$$

$$0.1<fLP/fL<2$$

where fL is the focal length of said last lens group, fLP is the focal length of said partial lens group in said last lens group, and ΔSLP is the maximum displacement amount of said partial lens group in the direction perpendicular to the optical axis upon vibration reduction.

2. A lens system according to claim 1, wherein said partial lens group in said last lens group is fixed in position along the optical axis in a short distance focusing state.

3. A lens system according to claim 1, wherein said lens system satisfies:

$$0.5<|fL|/f<4$$

where fL is the focal length of said last lens group, and f is the focal length of the entire lens system in an infinity photographing state.

4. A lens system according to claim 1, wherein said lens system satisfies:

$$1.5<N-$$

$$30<v-$$

where N− is the maximum one of refractive indices of negative lens components in said partial lens group in said last lens group, and v− is the minimum one of Abbe's numbers of the negative lens components in said partial lens group.

5. A lens system capable of a short distance photographing, which satisfies:

|βM|>0.25 (βM is the photographing magnification at a shortest photographing distance)

said lens system comprising:

a plurality of lens groups respectively having positive or negative refracting powers, wherein at least two intervals between two neighboring lens groups chance for focusing, and at least a partial lens group, located at an image side of a lens group which is movable for focusing, is a vibration reduction lens group which is movable in a direction substantially perpendicular to an optical axis;

wherein said plurality of lens groups include, in turn from an object side, a first lens group having a positive refracting power, a second lens group having a positive refracting power, and a last lens group which is arranged at the most image side and has a negative refracting power, and when focusing is effected from infinity to a short distance object, said first and second lens groups move toward the object side, and a partial lens group constituting said last lens group and having a negative refracting power constitutes said vibration reduction lens group; and wherein said lens system satisfies:

$$\Delta SLP/D<0.2$$

$$L/f<0.5$$

where D is the effective diameter of a surface, at the most object side, of said partial lens group in said last lens group, ΔSLP is the maximum displacement amount of said partial lens group in the direction perpendicular to the optical axis upon vibration reduction, L is the on-axis thickness of said partial lens group, and f is the focal length of the entire lens system in an infinity photographing state.

6. A lens system capable of short distance photographing, which satisfies:

|βM|>0.25 (βM is the photographing magnification at a shortest photographing distance)

said lens system comprising:

a first lens group arranged closest to an object side and having a positive refracting power;

a second lens group arranged at an image side of said first lens group and having a positive refracting power;

a last lens group arranged closest to the image side and having a negative refracting power; and displacement means for moving only a partial lens group having a positive refracting power, which is only a part of said last lens group, in a direction substantially perpendicular to an optical axis for vibration reduction, wherein said first and second lens groups move toward the object side when focusing is effected from infinity to a short distance object; and wherein said lens system satisfies:

$$\Delta SLP/fLP<0.1$$

$$0.1<fLP/|fL|<2$$

where fL is the focal length of said last lens group, fLP is the focal length of said partial lens group in said last lens group, and ASLP is the maximum displacement amount of said partial lens group in the direction perpendicular to the optical axis upon vibration reduction.

7. A lens system capable of short distance photographing, which satisfies:

|βM|>0.25 (βM is the photographing magnification at a shortest photographing distance)

said lens system comprising:

a first lens group arranged closest to an object side and having a positive refracting power;

a second lens group arranged at an image side of said first lens group and having a positive refracting power;

a last lens group arranged closest to the image side and having a negative refracting power; and displacement means for moving only a partial lens group having a positive refracting power, which is only a part of said last lens groups in a direction substantially perpendicular to an optical axis for vibration reductions, wherein said first and second lens groups move toward the object side when focusing is effected from infinity to a short distance object; and wherein said lens system satisfies:

$$\Delta SLP/D<0.2$$

$$L/f<0.5$$

where D is the effective diameter of a surface, at the most object side, of said partial lens group in said last lens group, ΔSLP is the maximum displacement amount of said partial lens group in the direction perpendicular to the optical axis upon vibration reduction, f is the focal length of the entire lens system in an infinity photographing state, and L is the thickness, along the optical axis, of said partial lens group.

* * * * *